(12) United States Patent
Kawata

(10) Patent No.: US 9,070,058 B2
(45) Date of Patent: Jun. 30, 2015

(54) COMMUNICATION DEVICE

(75) Inventor: Shogo Kawata, Tokyo (JP)

(73) Assignee: FELICA NETWORKS, INC., Tokyo (JP)

( * ) Notice: Subject to any disclaimer, the term of this patent is extended or adjusted under 35 U.S.C. 154(b) by 250 days.

(21) Appl. No.: 13/415,243

(22) Filed: Mar. 8, 2012

(65) Prior Publication Data

US 2012/0252362 A1 Oct. 4, 2012

(30) Foreign Application Priority Data

Mar. 28, 2011 (JP) ................. 2011-070006

(51) Int. Cl.
*H04B 5/00* (2006.01)
*G06K 19/07* (2006.01)

(52) U.S. Cl.
CPC ........ *G06K 19/0719* (2013.01); *G06K 19/0724* (2013.01)

(58) Field of Classification Search
CPC ................... G06K 19/0723; H04B 1/71637
USPC ....................................... 455/41.1
See application file for complete search history.

(56) References Cited

U.S. PATENT DOCUMENTS

| | | | | |
|---|---|---|---|---|
| 4,678,992 A * | 7/1987 | Hametta | ................. | 324/207.25 |
| 7,142,811 B2 * | 11/2006 | Terranova et al. | ............ | 455/41.1 |
| 7,200,144 B2 * | 4/2007 | Terrell et al. | ................. | 370/389 |
| 7,292,567 B2 * | 11/2007 | Terrell et al. | ................. | 370/363 |
| 7,362,702 B2 * | 4/2008 | Terrell et al. | ................. | 370/230 |
| 7,574,173 B2 * | 8/2009 | Terranova et al. | ............ | 455/41.1 |
| 8,576,021 B2 * | 11/2013 | Hill | ............ | 331/177 V |
| 8,901,880 B2 * | 12/2014 | Cook et al. | ................. | 320/108 |
| 2003/0210686 A1 * | 11/2003 | Terrell et al. | ................. | 370/389 |
| 2005/0263591 A1 * | 12/2005 | Smith | ............ | 235/385 |
| 2006/0136970 A1 * | 6/2006 | Salomons | ............ | 725/81 |
| 2007/0082611 A1 * | 4/2007 | Terranova et al. | ............ | 455/41.1 |
| 2008/0090540 A1 * | 4/2008 | Rofougaran | ............ | 455/289 |
| 2009/0069018 A1 * | 3/2009 | Babbar | ............ | 455/445 |
| 2009/0156209 A1 * | 6/2009 | Franklin et al. | ............ | 455/435.2 |
| 2009/0273454 A1 * | 11/2009 | Onozuka et al. | ............ | 340/10.51 |
| 2010/0157827 A1 * | 6/2010 | Park et al. | ............ | 370/252 |
| 2010/0214076 A1 * | 8/2010 | Yamamoto | ............ | 340/10.4 |
| 2011/0241750 A1 * | 10/2011 | Hill | ............ | 327/306 |
| 2012/0158949 A1 * | 6/2012 | Lee | ............ | 709/224 |
| 2012/0252362 A1 * | 10/2012 | Kawata | ............ | 455/41.1 |
| 2014/0082042 A1 * | 3/2014 | Johnson | ............ | 709/201 |
| 2014/0159622 A1 * | 6/2014 | Morii et al. | ............ | 318/400.3 |

FOREIGN PATENT DOCUMENTS

| | | |
|---|---|---|
| JP | 2008-017012 A | 1/2008 |
| JP | 2009-272697 A | 11/2009 |

\* cited by examiner

*Primary Examiner* — Hai V Nguyen
(74) *Attorney, Agent, or Firm* — Hazuki International, LLC

(57) ABSTRACT

A communication device includes: a communication unit that adjusts communication characteristics; a setting unit that sets adjustment values used in adjustment of the communication characteristics of the communication unit among parameters of the adjustable communication characteristics set for applications relating to communication on the basis of the parameters corresponding to the application which is a process target; and an adjustment control unit that controls the communication unit to adjust the communication characteristics on the basis of the adjustment values.

14 Claims, 11 Drawing Sheets

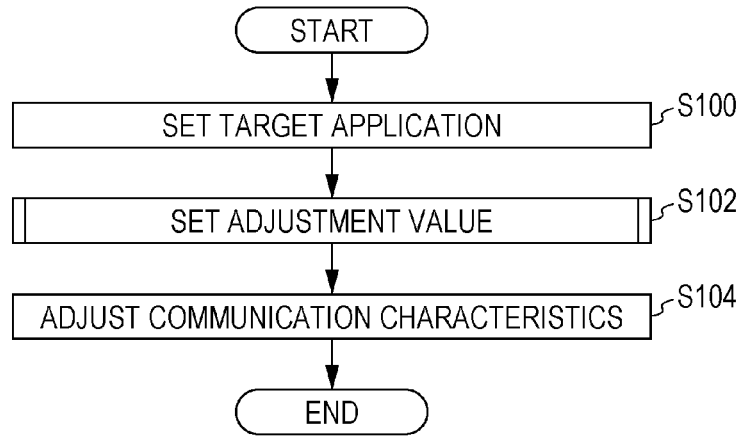

| | ADJUSTMENT VALUE (NUMBER) | | | | |
|---|---|---|---|---|---|
| | 1 | 2 | 3 | 4 | 5 |
| RESONANCE FREQUENCY | USABLE | USABLE | USABLE | USABLE | USABLE |
| Q VALUE | USABLE | USABLE | USABLE | USABLE | |
| LOAD MODULATION INTENSITY | USABLE | USABLE | USABLE | | |
| INPUT ADJUSTMENT VALUE | USABLE | USABLE | USABLE | USABLE | |

FIG. 7

| | ADJUSTMENT VALUE (NUMBER) | | | | |
|---|---|---|---|---|---|
| | 1 | 2 | 3 | 4 | 5 |
| RESONANCE FREQUENCY | | | USABLE | USABLE | USABLE |
| Q VALUE | USABLE | USABLE | USABLE | | |
| LOAD MODULATION INTENSITY | | USABLE | USABLE | USABLE | USABLE |
| INPUT ADJUSTMENT VALUE | | | USABLE | USABLE | USABLE |

| | ADJUSTMENT VALUE (NUMBER) | | | | |
|---|---|---|---|---|---|
| | 1 | 2 | 3 | 4 | 5 |
| RESONANCE FREQUENCY | | | USABLE | USABLE | USABLE |
| Q VALUE | USABLE | USABLE | USABLE | | |
| LOAD MODULATION INTENSITY | | USABLE | USABLE | | |
| INPUT ADJUSTMENT VALUE | | | | USABLE | USABLE |

COMMUNICATION DEVICE

CROSS-REFERENCE TO RELATED APPLICATION

The present application claims priority from Japanese Patent Application No. JP 2011-070006 filed in the Japanese Patent Office on Mar. 28, 2011, the entire content of which is incorporated herein by reference.

BACKGROUND

The present disclosure relates to a communication device.

Recently, communication devices capable of communicating with a reader/writer (or a communication device having a reader/writer function, hereinafter, the same) in a non-contact manner have come into wide use, for example, mobile phones provided with a non-contact IC (Integrated Circuit) card, an RFID (Radio Frequency Identification) tag, and a non-contact IC chip.

The communication device such as the reader/writer, the IC card, and the mobile phone uses magnetic field (carrier wave) of a specific frequency such as 13.56 MHz in communication. Specifically, the reader/writer transmits the carrier wave carrying with a transmission signal, and the communication device receiving the carrier wave by an antenna answers a response signal for the received transmission signal by load modulation, thereby performing communication between the reader/writer and the communication device.

The communication between the reader/writer and the communication device is internationally standardized as, for example, ISO 18092 standard (NFC (Near Field Communication) standard), and services using the non-contact communication described above are provided around the world.

In this context, a technique of achieving stabilization of communication has been developed. For example, there are techniques disclosed in Japanese Unexamined Patent Application Publication No. 2008-17012 and Japanese Unexamined Patent Application Publication No. 2009-272697 for preventing a phenomenon (so-called "null points") in which it is not possible to perform communication normally, where there are points at certain distances in which the non-contact communication can be difficult to perform.

SUMMARY

As described above, the non-contact communication between the reader/writer and the communication device is internationally standardized as, for example, ISO 18092 standard, and a service using the non-contact communication is provided around the world. In the service provided in advance, for example, a communication distance and an acceptable amount of null points may be different for each service. In this case, in the non-contact communication between the reader/writer and the communication device, for example, communication characteristics for performing communication are different for each service. For this reason, for example, as a reader/writer, even when a device (hereinafter, "infrastructure device") on the providing side that provides the service in advance satisfies the ISO standard, the communication device might not perform communication with infrastructure devices with various communication characteristics providing various services.

For example, in the related art (hereinafter, referred to as "Related Art 1") disclosed in Japanese Unexamined Patent Application Publication No. 2008-17012, the reader/writer detects an error of communication, a resonance frequency or the like is changed, and the communication characteristics are changed. For this reason, when using Related Art 1, it is necessary to replace the existing infrastructure device such as the reader/writer relating to the service provided in advance. Accordingly, it is difficult to apply Related Art 1 to realize "the communication device can perform communication with the infrastructure devices with different communication characteristics providing various services".

For example, in the related art (hereinafter, referred to as "Related Art 2") disclosed in Japanese Unexamined Patent Application Publication No. 2009-272697, the communication device changes a Q value according to whether or not a reception voltage is higher than a threshold value set in advance, to change communication characteristics. Accordingly, since Related Art 2 is a valid technique between a specific reader/writer and a specific communication device, it is necessary to replace both of the infrastructure device and the communication device when using Related Art 2. Accordingly, it is difficult to apply Related Art 2 to realize "the communication device can perform communication with the infrastructure devices with various communication characteristics providing various services".

As described above, even when using the related art (hereinafter, generally referred to as "related art") to achieve stabilization of communication as Related Art 1 and Related Art 2, it is difficult to realize "the communication device can perform communication with the infrastructure devices with various communication characteristics providing various services". Accordingly, a user might not easily enjoy various services provided by the infrastructure device with various communication characteristics using one communication device.

It is desirable to provide a novel and improved communication device, communication control method, and program capable of performing communication with an infrastructure device with different communication characteristics.

According to an embodiment of the present disclosure, there is provided a communication device including: a communication unit that has adjustable communication characteristics; a setting unit that sets adjustment values used in adjustment of the communication characteristics of the communication unit on the basis of parameters corresponding to an application that is a process target among parameters of the adjustable communication characteristics set for applications relating to communication; and an adjustment control unit that controls the communication unit to adjust the communication characteristics on the basis of the adjustment values. Hereinafter, an application that is a process target is referred to as a "target application."

With such a configuration, it is possible to perform communication with infrastructure devices with various communication characteristics.

In the communication device, when there are a plurality of target applications, the setting unit may determine parameters of adjustable overlapped communication characteristics such that the plurality of target applications perform the communication on the basis of the parameters of each application, and may set adjustment values corresponding to the parameters of the overlapped communication characteristics.

In the communication device, when there is no parameter of the overlapped communication characteristics, the setting unit may reset the target application, and may set the adjustment values on the basis of the parameters of each reset target application.

In the communication device, the setting unit may estimate a usable application using position information representing a current position of the communication device and/or time information representing a current time to reset the estimated application as the target application.

In the communication device, the setting unit may exclude one or more applications with low priority from the process target on the basis of priority set for each target application to reset the target application.

In the communication device, the setting unit may set the priority corresponding to frequency in use on the basis of history information representing use history of the application, for each application.

In the communication device, the history information may include position history information representing a position where the application is used, and/or time history information representing a time when the application is used, and the setting unit may set the priority based on the history information corresponding to the current position of the communication device and/or the current time of the history information, on the basis of the position information representing the current position of the communication device and the position history information and/or the time information representing the current time, and the time history information.

In the communication device, when the communication unit receives the carrier wave transmitted from an external device of a communication target and does not perform communication for a predetermined time, the setting unit may decrease the priority of one or more applications with high priority among the priority set for each target application.

In the communication device, when the communication unit receives the carrier wave transmitted from an external device of a communication target and does not perform communication for a predetermined time, the setting unit may decrease the priority of one or more applications with high priority among the priority set for each target application to reset the adjustment value.

In the communication device, when the communication unit receives the carrier wave transmitted from an external device of a communication target and does not perform communication for a predetermined time, the setting unit may reset the adjustment value on the basis of parameters corresponding to the application selected by user.

In the communication device, when there is no overlapped parameter of the communication characteristics, the setting unit may adjust the parameters corresponding to one or more target application, and may determine the parameters of the adjustable overlapped communication characteristics such that the plurality of applications perform communication on the basis of the adjusted parameters.

In the communication device, the communication unit may include a communication antenna that performs transmission and reception of a carrier wave, an adjustment unit that adjusts the communication characteristics on the basis of the transmitted adjustment signal, and a processing unit that transmits the adjustment signal to the adjustment unit on the basis of an adjustment command transmitted from the adjustment control unit.

In the communication device, the communication antenna may include a resonance circuit provided with a coil having a predetermined inductance and a capacitor having a predetermined capacitance, and the adjustment unit may adjust a resonance frequency of the communication antenna and/or a Q value of the communication antenna, as the communication characteristics.

In the communication device, when the communication unit performs communication with an external device of the communication target by non-contact communication using a carrier wave of a predetermined frequency, the adjustment unit may adjust intensity of load modulation and/or an attenuation amount of a signal based on the transmission signal received by the communication antenna and transmitted from the external device, as the communication characteristics.

In the communication device, the communication unit may include a plurality of the communication antennas having a resonance circuit with a different resonance frequency provided with a coil having a predetermined inductance and a capacitor having a predetermined capacitance, and the adjustment unit may select one communication antenna among the plurality of communication antennas, and may adjust the resonance frequency of the communication antenna used in communication, as the communication characteristics.

The communication device may further include a storage unit that stores one or more applications and the parameters corresponding to the applications.

According to the embodiments of the present disclosure, it is possible to perform communication with infrastructure devices with various communication characteristics.

BRIEF DESCRIPTION OF THE DRAWINGS

FIG. 5 is a flowchart illustrating an example of a process according to a communication control method according to the embodiment of the present disclosure.

FIG. 6 is a diagram illustrating an example of adjustment information according to the embodiment of the present disclosure.

FIG. 7 is a diagram illustrating an example of adjustment information according to the embodiment of the present disclosure.

DETAILED DESCRIPTION OF EMBODIMENTS

Figure 1:
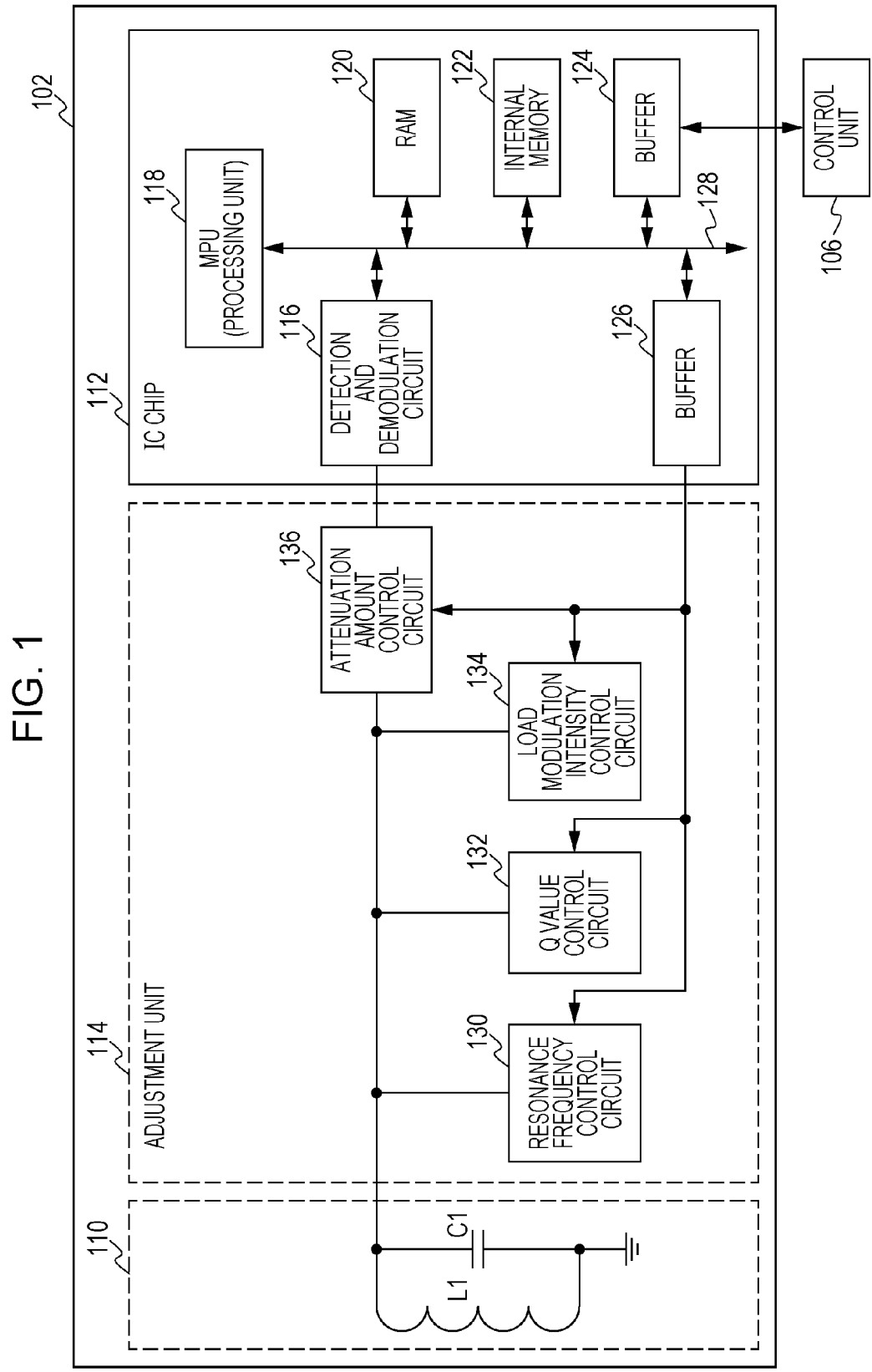
FIG. 1 is a diagram illustrating an example of a communication characteristic adjusting unit of a communication device according to an embodiment of the present disclosure.

Hereinafter, embodiments of the present disclosure will be described in detail with reference to the accompanying drawings. In the specification and the drawings, the same reference numerals and signs are given to the constituent elements having substantially the same functional configuration, and the description thereof is not repeated.

The description is performed below in the following order.
1. Communication Control Method according to Embodiment of Present Disclosure
2. Communication Device according to Embodiment of Present Disclosure
3. Program according to Embodiment of Present Disclosure (Communication Control Method according to Embodiment of Present Disclosure)
[Outline of Communication Control Method according to Embodiment of Present Disclosure]

Before describing a configuration of a communication device (hereinafter, referred to as "communication device 100" according to an embodiment of the present disclosure, an outline of a communication control method according to an embodiment of the present disclosure will be described. Hereinafter, the communication device 100 performs a process relating to the communication control method according to the embodiment of the present disclosure.

Hereinafter, a case where the communication device 100 and an infrastructure device perform non-contact communication relating to NFC using a carrier wave of a specific frequency such as 13.56 MHz in communication will be mainly described by way of example. Communication between the communication device 100 according to the embodiment of the present disclosure and the infrastructure device is not limited to the non-contact communication relating to the NFC. For example, the communication control device according to the embodiment of the present disclosure to be described later may be applied to various communication methods in which communication characteristics can be adjusted such as contact-type non-contact communication, proximity type non-contact communication, and distance type non-contact communication of a UHF (Ultra High Frequency) band.

Herein, the communication characteristics according to the embodiment of the present disclosure are, for example, characteristics relating to communication such as physical characteristics relating to communication and logical characteristics relating to communication. The physical characteristics relating to communication according to embodiment of the present disclosure may be, for example, a resonance frequency of the communication antenna, a Q value of the communication antenna, and an intensity of load modulation. The logical characteristics relating to communication according to the embodiment of the present disclosure may be, for example, Type A, Type B, and Type C in the NFC standard. It is obvious that the physical characteristics and logical characteristics according to the embodiment of the present disclosure are not limited to the above description.

As described above, for example, by replacing the infrastructure device relating to the service provided in advance, it is difficult to achieve "the communication device can perform the communication with each infrastructure device with different communication characteristics providing various services". In the embodiment of the present disclosure, the communication device 100 sets adjustment values used in adjustment of communication characteristics in which all the applications of a process target can perform communication on the basis of parameters for each application (application software) relating to communication. The communication device 100 adjusts the communication characteristics using the set adjusted values to perform the communication.

As described above, by adjusting the communication characteristics, the communication device 100 can perform communication with each infrastructure device even when there is a difference in communication characteristics of one or more infrastructure devices providing a service corresponding to the target application. Accordingly, since the communication device 100 can perform communication with each infrastructure device with different communication characteristics, the user (hereinafter, merely referred to as "user") of the communication device 100 can enjoy various services provided by the infrastructure devices with different communication characteristics using the communication device 100.

The parameters according to the embodiment of the present disclosure are, for example, parameters of communication adjustable communication characteristics, and the parameters are used to enjoy the services relating to communication with the infrastructure devices as described above. Hereinafter, a case where the communication device 100 according to the embodiment of the present disclosure performs a process using adjustment information that is data representing the parameters will be described by way of example. An example of the parameters according to the embodiment of the present disclosure and an example of the adjustment information will be described later. Hereinafter, a general term of a plurality of parameters (that is, parameter group) may be "parameters".

The application relating to communication according to the embodiment of the present disclosure may be software for each service performed on, for example, an operating system (OS). Herein, the application relating to communication according to the embodiment of the present disclosure may be, for example, an application installed in advance at the time of producing the communication device 100 or an application additionally installed by the user. The application relating to communication according to the embodiment of the present disclosure is not limited to the above description. For example, the application relating to communication according to the embodiment of the present disclosure may be software constituting the operating system. That is, in the application relating to communication according to the embodiment of the present disclosure, one piece of software may correspond to a plurality of services, and the application is software for each service. Hereinafter, the application relating to communication according to the embodiment of the present disclosure is software for each service, including a case where one piece of software corresponds to the plurality of services.

The target application according to the embodiment of the present disclosure may all the applications corresponding to all the services in the communication device 100, but the target application according to the embodiment of the present disclosure is not limited to the above description. For example, the target application according to the embodiment of the present disclosure may be a part of applications selected from all the applications. An example of a process relating to setting (or resetting) of the target application according to the embodiment of the present disclosure will be described later.

[Example of Process relating to Communication Control Method according to Embodiment of Present Disclosure]

Next, an example of a process relating to a communication control method according to the embodiment of the present disclosure will be described. As described above, the communication device 100 using the communication control method according to the embodiment of the present disclosure sets adjustment values by which all the target applications can perform communication, and adjusts communication characteristics using the set adjustment values to perform the communication. Herein, before describing the process relating to the communication control method according to the embodiment of the present disclosure, first, an example of a communication characteristic adjusting unit according to the embodiment of the present disclosure will be described.

[Example of Communication Characteristic Adjusting Unit according to Embodiment of Present Disclosure]

FIG. 1 is a diagram illustrating an example of the communication characteristic adjusting unit in the communication device 100 according to the embodiment of the present disclosure. FIG. 1 shows a part of a configuration of the communication device 100 when the communication device 100 perform non-contact communication relating to NFC using a carrier wave of a specific frequency such as 13.56 MHz in communication. More specifically, FIG. 1 shows an example of a configuration of a communication unit 102 that performs communication with the external device such as the infrastructure device. FIG. 1 also shows a control unit 106 (to be described later) initiatively performs the process relating to the communication control method according to the embodiment of the present disclosure.

Referring to FIG. 1, for example, the communication unit 102 includes a communication antenna 110 that receives a carrier wave, an IC chip 112 that demodulates a transmission signal transmitted from the external device on the basis of the received carrier waver to transmit a response signal to the communication antenna 110 by load modulation, and an adjustment unit 114 that adjusts communication characteristics. The IC chip 112 takes a role of causing the adjustment unit 114 to adjust the communication characteristics, that is, a role of controlling the communication unit 102 to adjust the communication characteristics. A configuration of the communication unit 102 according to the embodiment of the present disclosure is not limited to the configuration shown in FIG. 1. For example, the communication device 100 according to the embodiment of the present disclosure may not be provided with the IC chip 112 shown in FIG. 1 in the form of the IC chip. The communication device 100 may take various configurations, for example, a load modulation intensity control circuit 134 among circuits constituting the adjustment unit 114 shown in FIG. 1 is provided in the IC chip 112.

The communication antenna 110 has a resonance circuit formed of a coil (inductor) L1 having a predetermined inductance and a capacitor C1 having a predetermined capacitance. The communication antenna 110 causes inductive voltage by electromagnetic induction according to reception of the carrier wave. The communication antenna 110 outputs the reception voltage obtained by resonating the inductive voltage at a predetermined resonance frequency to the IC chip 112 through an attenuation control circuit 136 (to be described later) constituting the adjustment unit 114. The resonance frequency in the communication antenna 110 is set according to a frequency of the carrier wave, for example, 13.56 MHz.

For example, by the configuration shown in FIG. 1, the communication antenna 110 receives the carrier wave and performs transmission of the response signal by load modulation performed in the load modulation intensity control circuit 134 (to be described later) provided in the adjustment unit 114.

The configuration of the communication antenna constituting the communication unit 102 according to the embodiment of the present disclosure is not limited to the configuration shown in FIG. 1. For example, the communication unit 102 according to the embodiment of the present disclosure may be provided with a plurality of communication antennas having the resonance circuits with different resonance frequencies. In the case described above, in the communication unit 102, for example, one communication antenna is selected from the plurality of communication antennas by the adjustment unit 114, and communication with the external device is performed using the selected communication antenna. As described above, it is possible to adjust the resonance frequency of the communication antenna by performing the communication selectively using one communication antenna of the plurality of communication antennas with different resonance frequencies. Accordingly, the communication device 100 can adjust the communication characteristics in the communication unit 102 even in the case described above.

For example, the IC chip is formed by realizing various functions relating to non-contact communication using the carrier wave with the reader/writer (example of external device) as the infrastructure device, by an integrated circuit. For example, the IC chip 112 includes a detection and demodulation circuit 116, an MPU 118 (processing unit), a RAM 120, an internal memory 122, a buffer 124 (communication buffer) relating to communication with the control unit 106, and a buffer 126 used to transmit various signals such as a load modulation signal and an adjustment signal to the adjustment unit 114. The detection and demodulation circuit 116, the MPU 118, the RAM 120, the internal memory 122, the buffer 124, and the buffer 126 are connected by, for example, a bus 128 as a transmission path of data.

The detection and demodulation circuit 116 rectifies reception voltage (in the example shown in FIG. 1, reception voltage transmitted through the attenuation amount control circuit 136) output from the communication antenna 110. Herein, the detection and demodulation circuit 116 includes a detection circuit formed of, for example, a diode and a capacitor to perform the rectification. The detection and demodulation circuit 116 demodulates the transmission signal on the basis of the reception voltage, and outputs data (for example, digital data signal binarized with high level and low level) corresponding to the transmission signal included in the carrier wave.

The MPU 118 is formed of an MPU (Micro Processing Unit) and an integrated circuit in which various circuits are integrated to realize various functions such as a control function, and initiatively perform a process for controlling the communication in the communication unit 102 and controlling adjustment of the communication characteristics in the communication unit 102. More specifically, for example, the MPU 118 processes the demodulated data (data signal) on the detection and demodulation circuit 116, and generates a load modulation signal for controlling load modulation when a response is performed. The MPU 118 transmits the load modulation signal to the load modulation intensity control unit 134 performing the load modulation through the buffer 126.

When the adjustment command transmitted from the control unit 106 (more precisely, the adjustment control unit to be described later) is transmitted through the buffer 124, the MPU 118 generates an adjustment signal for controlling the adjustment unit 114 to adjust the communication characteristics and transmits the adjustment signal to the adjustment unit 114 through the buffer 126. When the load modulation intensity is adjusted as the communication characteristics to be adjusted, for example, the MPU 118 may allow the load modulation signal to have a role of the adjustment signal.

The MPU 118 may change logical characteristics relating to communication. In the case described above, the MPU 118 serves as a part of the adjustment unit according to the embodiment of the present disclosure.

The adjustment unit 114 adjusts the communication characteristics on the basis of the adjustment signal transmitted from the MPU 118 through the buffer 126. FIG. 1 shows a configuration in which the adjustment unit 114 includes a resonance frequency control circuit 130 that adjusts a resonance frequency of the communication antenna 110, a Q value control circuit 132 that adjusts a Q value of the communication antenna 110, a load modulation intensity control circuit 134, and an attenuation amount control circuit 136 that adjusts an attenuation amount of a signal based on the transmission signal.

A configuration of the adjustment unit 114 according to the embodiment of the present disclosure is not limited to the configuration shown in FIG. 1. For example, the adjustment unit 114 according to the embodiment of the present disclosure may be provided with an antenna selecting circuit that validates (selects) a communication antenna used in communication from a plurality of communication antennas, and an inductor adjustment circuit that adjusts inductance by selecting a tap provided in the inductor constituting the communication antenna 110. In the case described above, the adjustment unit 114 may adjust the resonance frequency of the communication antenna 110 as the communication characteristics. The adjustment unit 114 according to the embodiment of the present disclosure may be provided with, for example, at least one of various circuits shown in FIG. 1 and the circuit described above. That is, the adjustment unit 114 according to the embodiment of the present disclosure may take an arbitrary configuration capable of adjusting physical characteristics relating to communication.

<Example of Configuration of Adjustment Unit 114>

As an example of a configuration of the adjustment unit 114, examples of configurations of the resonance frequency control circuit 130, the Q value control circuit 132, the load modulation intensity control circuit 134, and the attenuation amount control circuit 136 shown in FIG. 1 will be described.

(1) Example of Configuration of Resonance Frequency Control Circuit 130

Figure 2:
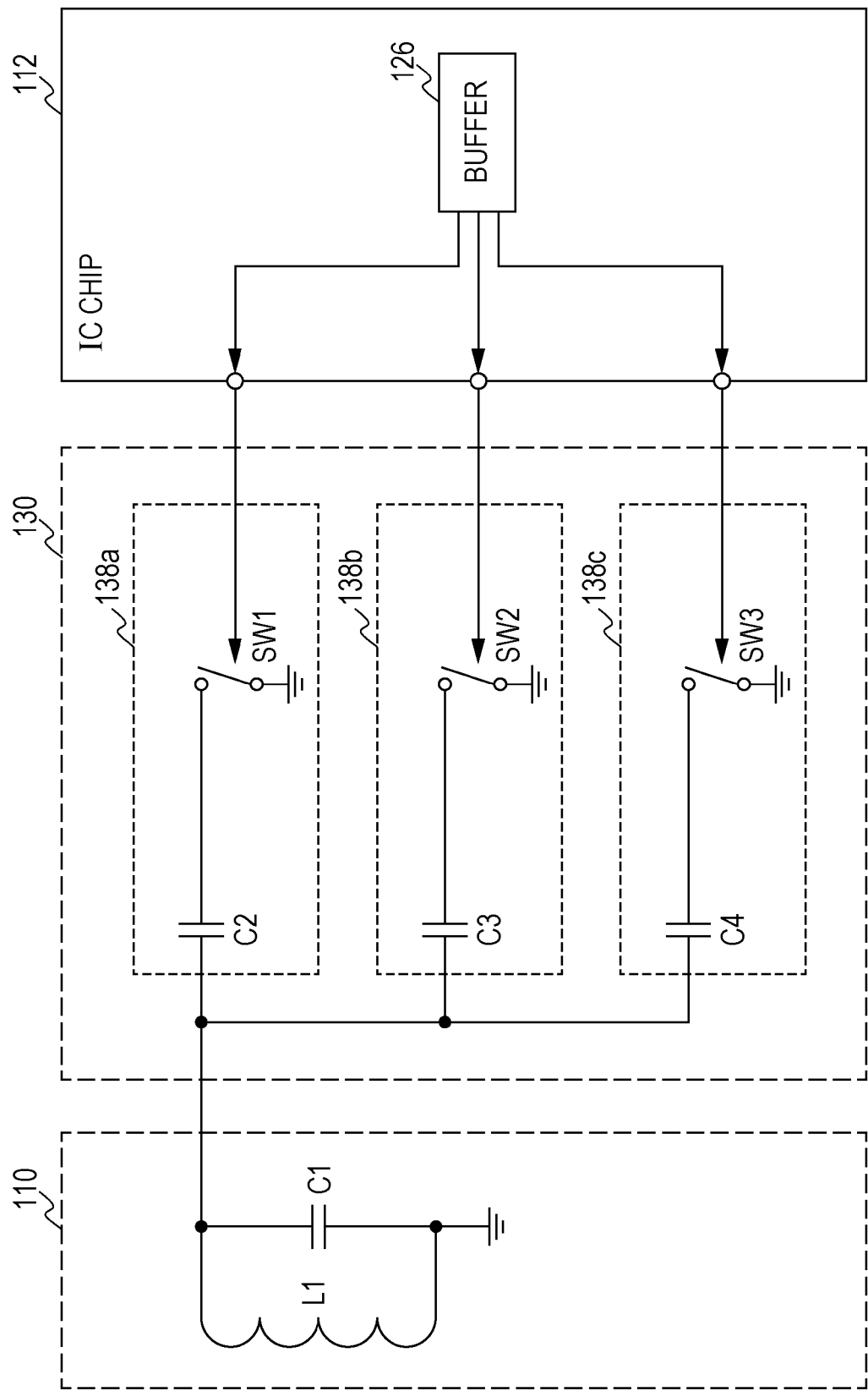
FIG. 2 is a diagram illustrating an example of a configuration of an adjustment unit according to the embodiment of the present disclosure.

FIG. 2 is a diagram illustrating an example of a configuration of the adjustment unit 114 according to the embodiment of the present disclosure, and shows an example of the resonance frequency control circuit 130. FIG. 2 also shows the communication antenna 110 and the buffer 126 constituting the IC chip 112.

The resonance frequency control circuit 130 includes capacitance adjusting units 138a, 138b, and 138c. Each of the capacitance adjusting unit 138a, 138b, and 138c is formed of a capacitor (capacitors C2 to C4) with different capacitance, and a switching element (switching elements SW1 to SW3) for selectively validating each capacitor. Each of the switching elements SW1 to SW3 is selectively turned on, on the basis of the adjustment signal transmitted from the IC chip 112. The switching elements SW1 to SW3 may be, for example, p-channel MOSFET (Metal Oxide Semiconductor Field Effect Transistor) and n-channel MOSFET, but the switching elements SW1 to SW3 are not limited thereto.

The communication device 100 is provided with the resonance frequency control circuit 130 shown in FIG. 2 as the adjustment unit 114 constituting the communication unit 102, to adjust the resonance frequency of the communication antenna 110 as the communication characteristics. The configuration of the resonance frequency control circuit 130 according to the embodiment of the present disclosure is not limited to the configuration shown in FIG. 2. For example, in FIG. 2, the resonance frequency control circuit 130 is provided with three capacitance adjusting units, but the resonance frequency control circuit 130 may be provided with one capacitance adjusting unit, two capacitance adjusting units, or four or more capacitance adjusting units.

(2) Example of Configuration of Q Value Control Circuit 132

Figure 3:
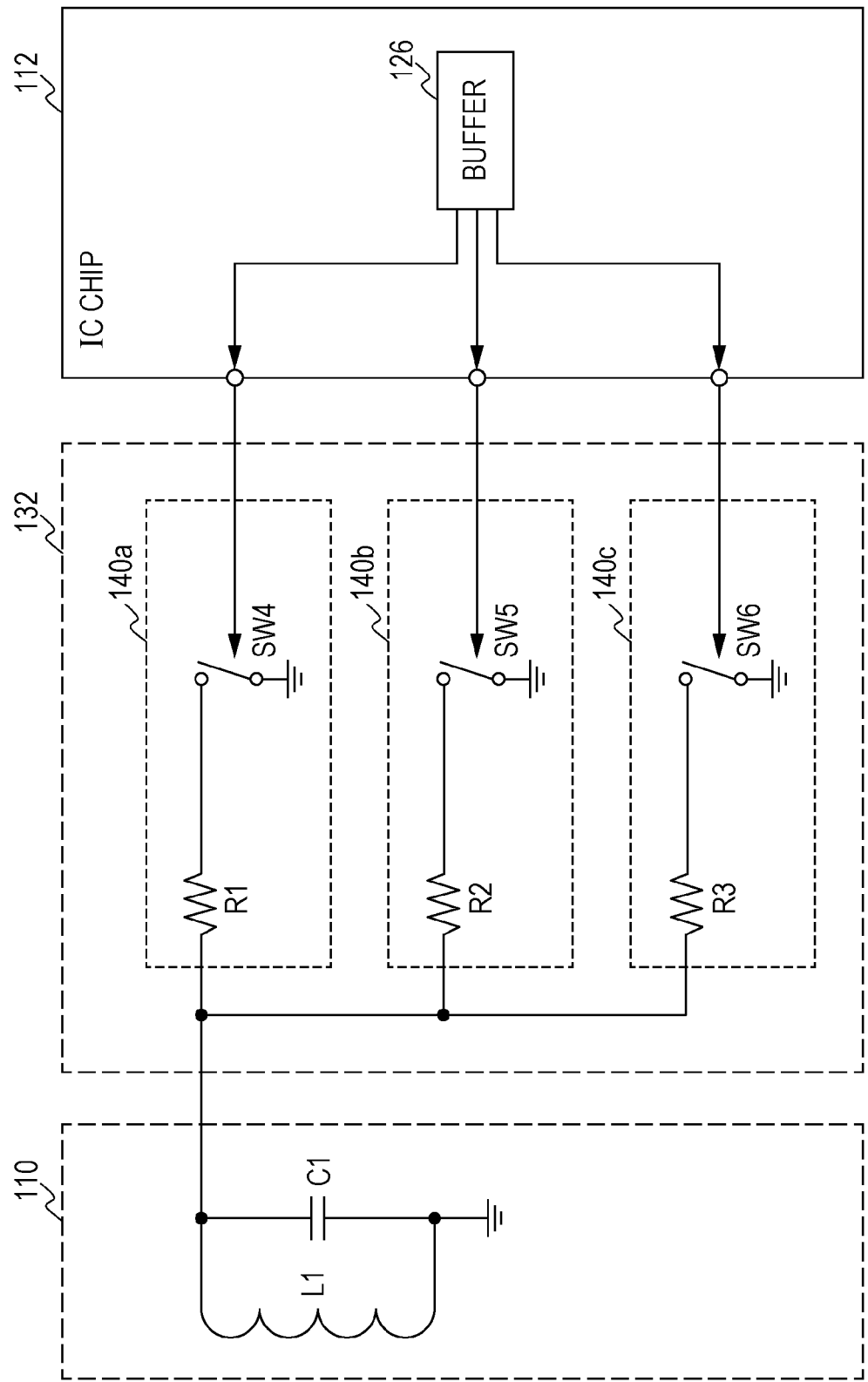
FIG. 3 is a diagram illustrating an example of a configuration of the adjustment unit according to the embodiment of the present disclosure.

FIG. 3 is a diagram illustrating an example of a configuration of the adjustment unit 114 according to the embodiment of the present disclosure, and shows an example of the Q value control circuit 132. FIG. 3 also shows the communication antenna 110 and the buffer 126 constituting the IC chip 112.

The Q value control circuit 132 includes Q value adjusting units 140a, 140b, and 140c. Each of the Q value adjusting unit 140a, 140b, and 140c is formed of a resistor (resistors R1 to R3) with different resistance, and a switching element (switching elements SW4 to SW6) for selectively validating each resistor. Each of the switching elements SW4 to SW6 is selectively turned on, on the basis of the adjustment signal transmitted from the IC chip 112. The switching elements SW4 to SW6 may be, for example, p-channel MOSFET and n-channel MOSFET, but the switching elements SW4 to SW6 are not limited thereto.

The communication device 100 is provided with the Q value control circuit 132 shown in FIG. 3 as the adjustment unit 114 constituting the communication unit 102, to adjust the Q value of the communication antenna 110 as the communication characteristics. The configuration of the Q value control circuit 132 according to the embodiment of the present disclosure is not limited to the configuration shown in FIG. 3. For example, in FIG. 3, the Q value control circuit 132 is provided with three Q value adjusting units, but the Q value control circuit 132 may be provided with one Q value adjusting unit, two Q value adjusting units, or four or more Q value adjusting units.

(3) Load Modulation Intensity Control Circuit 134

Figure 4:
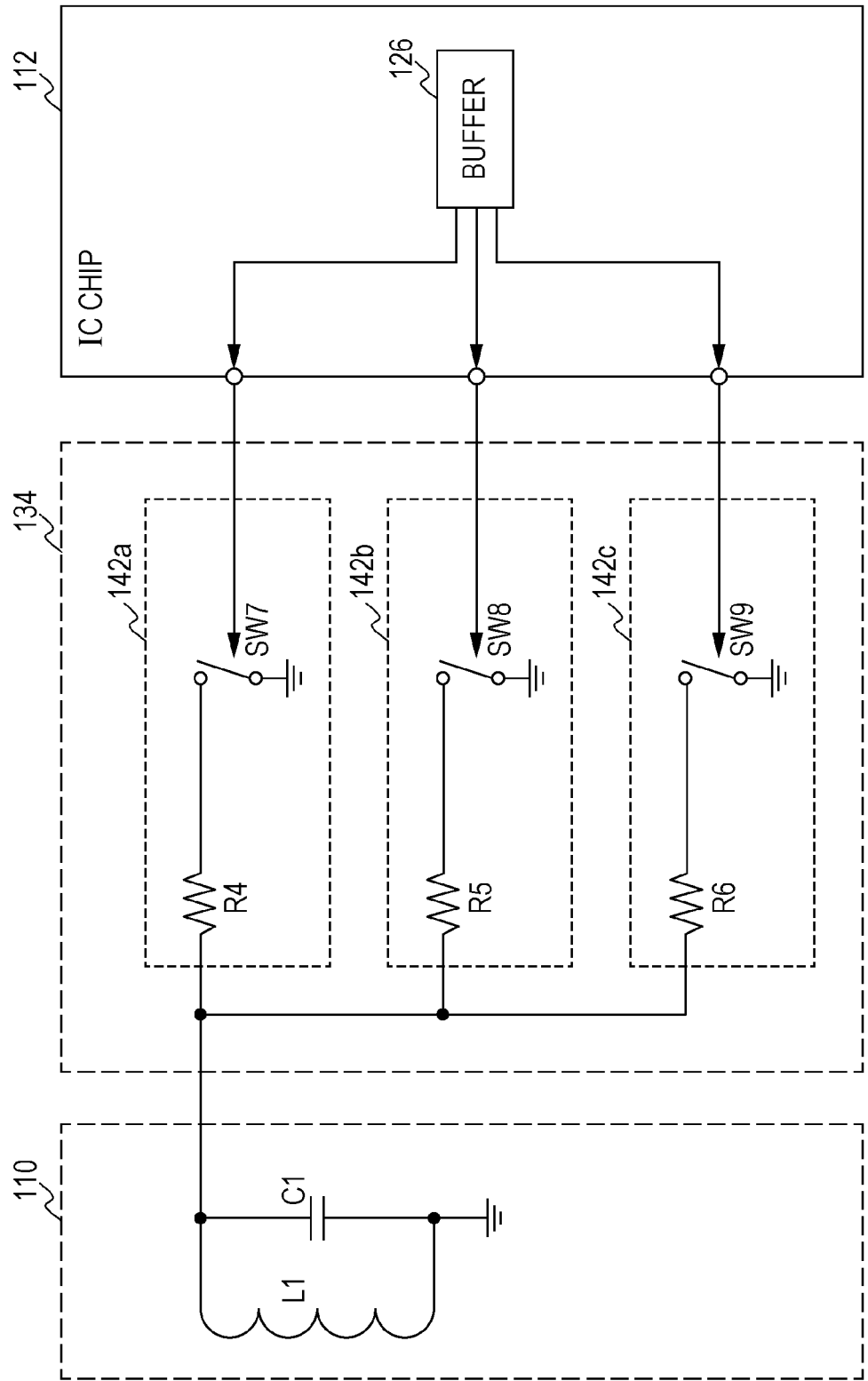
FIG. 4 is a diagram illustrating an example of a configuration of the adjustment unit according to the embodiment of the present disclosure.

FIG. 4 is a diagram illustrating an example of a configuration of the adjustment unit 114 according to the embodiment of the present disclosure, and shows an example of the load modulation intensity control circuit 134. FIG. 4 also shows the communication antenna 110 and the buffer 126 constituting the IC chip 112.

The load modulation intensity control circuit 134 includes load modulation units 142a, 142b, and 142c. Each of the load modulation unit 142a, 142b, and 142c is formed of a resistor (resistors R4 to R6) with a different resistance, and a switching element (switching elements SW7 to SW9) for selectively validating each resistor. Each of the switching elements SW7 to SW9 is selectively turned on, on the basis of the adjustment signal transmitted from the IC chip 112. The switching elements SW7 to SW9 may be, for example, p-channel MOSFET and n-channel MOSFET, but the switching elements SW7 to SW9 are not limited thereto.

The communication device 100 is provided with the load modulation intensity control circuit 134 shown in FIG. 4 as the adjustment unit 114 constituting the communication unit 102, to adjust the load modulation intensity as the communication characteristics. The configuration of the load modulation intensity control circuit 134 according to the embodiment of the present disclosure is not limited to the configuration shown in FIG. 4. For example, in FIG. 4, the load modulation intensity control circuit 134 is provided with three load modulation units, but the load modulation intensity control circuit 134 may be provided with one load modulation unit, two load modulation units, or four or more load modulation units.

(4) Attenuation Amount Control Circuit 136

For example, the attenuation amount control circuit 136 is formed of an AGC (Automatic Gain Control) circuit in which a gain is adjusted on the basis of the adjustment signal transmitted from the IC chip 112. The communication device 100 is provided with, for example, the AGC circuit as the adjustment unit 114 constituting the communication unit 102, to adjust the attenuation amount of the signal based on the transmission signal received by the communication antenna 110 and transmitted from the external device, as the communication characteristics. Accordingly, the communication device 100 is provided with, for example, the AGC circuit as the adjustment unit 114 constituting the communication unit 102, to prevent the IC chip 112 from being broken by the signal based on the received transmission signal.

The configuration of the attenuation amount control circuit 136 according to the embodiment of the present disclosure is not limited to the configuration of the AGC circuit. For example, the attenuation amount control circuit 136 may be provided with a clamp circuit that is formed of one or more diodes, and a switching element that selectively validates each of the clamp circuits.

For example, in the communication device 100, the communication characteristics are adjusted by an adjustment unit 114 provided with the resonance frequency control circuit 130, the Q value control circuit 132, the load modulation intensity control circuit 134, and the attenuation amount control circuit 136 described above.

(Specific Example of Process relating to Communication Control Method according to Embodiment of Present Disclosure)

Next, an example of a process relating to the communication control method according to the embodiment of the present disclosure will be described in more detail. Hereinafter, for example, the communication device 100 is provided with the communication unit 102 having the configuration shown in FIG. 1.

FIG. 5 is a flowchart illustrating an example of a process relating to the communication control method according to the embodiment of the present disclosure.

The communication device 100 sets applications of a process target (S100). For example, the communication device 100 sets all the applications corresponding to all the services corresponding to the communication device 100, as the target applications. The process of Step S100 is not limited thereto. For example, the communication device 100 may set partial applications such as applications selected by the user among all the corresponding applications, as the target applications.

When the target applications are set in Step S100, the communication device 100 sets the adjustment values used in adjustment of the communication characteristics of the communication unit 102 on the basis of the adjustment information corresponding to the target applications (S102, adjustment value setting process).

FIG. 6 and FIG. 7 are diagrams illustrating examples of the adjustment information according to the embodiment of the present disclosure. FIG. 6 and FIG. 7 show examples in which the resonance frequency relating to the adjustment in the resonance frequency control circuit 130, the Q value relating to the adjustment in the Q value control circuit 132, the load modulation intensity relating to the adjustment in the load modulation intensity control circuit 134, and the input adjustment value relating to the adjustment in the attenuation amount control circuit 136 are set as the adjustable communication characteristics. FIG. 6 and FIG. 7 shows examples in which values (or ranges of values of communication characteristics, hereinafter, the same) of the adjustable communication characteristics are set by division of five stages, that is, five adjustment values represented by numbers of 1 to 5 are set in the adjustment information. FIG. 6 and FIG. 7 show combination of the communication characteristics which can be adjusted by the applications and the values of the communication characteristics, and the values of the communication characteristics of the combined parts (in FIG. 6 and FIG. 7, parts of "usable") in FIG. 6 and FIG. 7 correspond to parameters of the communication characteristics corresponding to the applications. The adjustment information according to the embodiment of the present disclosure is not limited to the examples shown in FIG. 6 and FIG. 7. For example, there may be dependency among the parameters of the communication characteristics. As an example of the dependency, for example, a settable adjustment value for the load modulation intensity is 1 and 2 when the adjustment value of the resonance frequency is 1, and a settable adjustment value for the load modulation intensity is 3 and 4 when the adjustment value of the resonance frequency is 3.

The communication device 100 selects one adjustment value for each of the adjustable communication characteristics from the adjustment values set in the adjustment information, and sets the selected adjustment value as the adjustment value used in the adjustment of the communication characteristics of the communication unit 102. Herein, the setting of the adjustment value used in the adjustment of the communication characteristics of the communication unit 102 according to the embodiment of the present disclosure means, for example, a state where the adjustment value selected from the one or more adjustment values set in the adjustment information as described above can be used to generate the adjustment signal (or generate the adjustment command for generating the adjustment signal). For example, the communication device 100 records the selected adjustment value on a recording medium such as a RAM (Random Access Memory, not shown) provided in the communication device 100, to set the adjustment value used in the adjustment of the communication characteristics of the communication unit 102. It is obvious that the method of setting the adjustment values used in the adjustment of the communication characteristics of the communication unit 102 in the communication device 100 according to the embodiment of the present disclosure is not limited thereto. Hereinafter, an example of the adjustment value setting process in the communication device 100 according to the embodiment of the present disclosure will be described in more detail.

<Example of Adjustment Value Setting Process>

(i) First Example

Figures 8, 9:
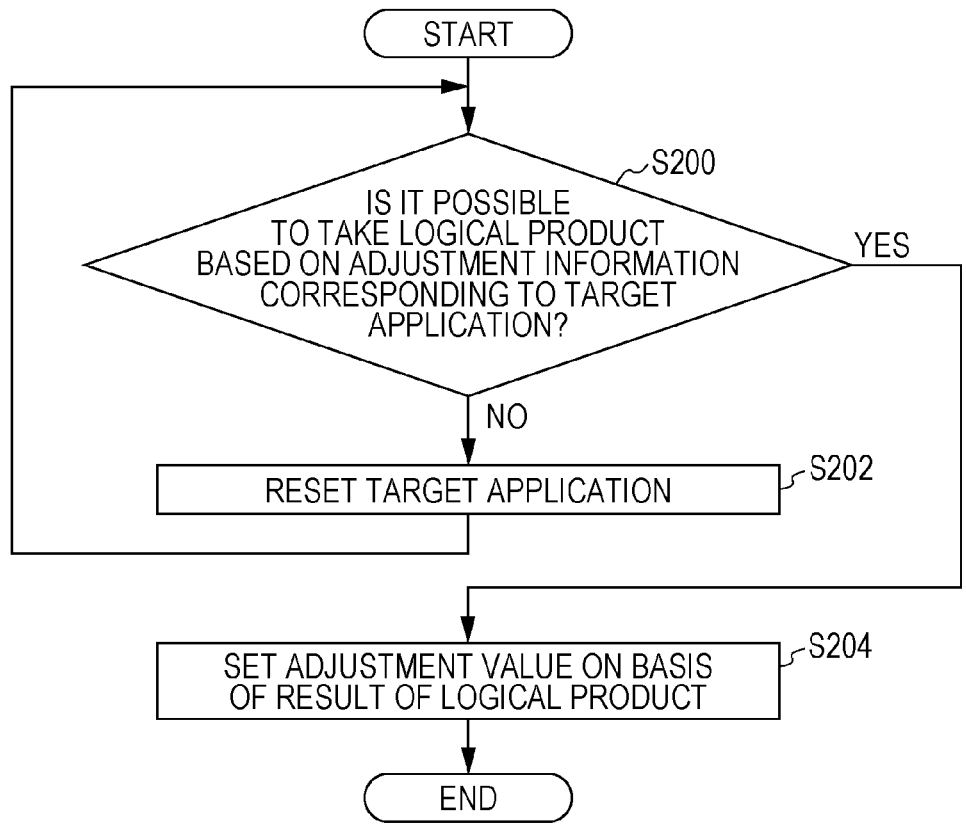
FIG. 8 is a flowchart illustrating an example of an adjustment value setting process according to the embodiment of the present disclosure.
FIG. 9 is a diagram illustrating an example of a result of logical product based on adjustment information in the adjustment value setting process according to the embodiment of the present disclosure.

FIG. 8 is a flowchart illustrating an example of the adjustment value setting process according to the embodiment of the present disclosure.

The communication device 100 determines whether or not it is possible to take a logical product based on the adjustment information corresponding to the target application (S200). The process of determining the logical product based on the adjustment information according to the embodiment of the present disclosure corresponds to a process of determining the parameters of the adjustable overlapped communication characteristics such that all the target applications perform communication. When there is only one target application, the communication device 100 can set the adjustment value using the adjustment information corresponding to the application. Accordingly, in the case described above, in Step S200, the communication device 100 determines that it is possible to take the logical product based on the adjustment information corresponding to the target application. When there is only one target application, the communication device 100 may not perform the process of Step S200 and may perform a process of Step S204 to be described later.

FIG. 9 is a diagram illustrating an example of a result of the logical product based on the adjustment information in the adjustment value setting process according to the embodiment of the present disclosure. FIG. 9 shows a result when the logical product based on the adjustment information shown in FIG. 6 and the adjustment information shown in FIG. 7 is taken.

In the example shown in FIG. 9, there are adjustable communication characteristics for all the resonance frequency, the Q value, the load modulation intensity, and the input adjustment value. Accordingly, when it is possible to obtain the result of the logical product shown in FIG. 9, the communication device 100 determines that it is possible to take the logical product based on the adjustment information corresponding to the target application in Step S200.

Herein, for example, when it is difficult to obtain the result of the logical product for any communication characteristic, the communication device 100 determines that it is difficult to take the logical product based on the adjustment information corresponding to the target application. That is, for example, when it is possible to obtain at least one logical product for several communication characteristics, the communication device 100 determines that it is possible to take the logical product based on the adjustment information corresponding to the target application.

The method of determining the parameters of the overlapped communication characteristics according to the embodiment of the present disclosure is not limited to the taking of the logical product based on the adjustment information described above. For example, adjustable ranges which are not discrete adjustment values and are regulated by the upper limit and the lower limit may be prepared, and numerical values included in the range of the adjustment information may be determined as the parameters of the overlapped communication characteristics. As the adjustment information, the discrete adjustment values and the adjustable ranges regulated by the upper limit and the lower limit may be commonly used, and the parameters of the overlapped communication characteristics may be determined according to whether or not the adjustment information of one discrete value is included in the other adjustable range.

Referring to FIG. 8 again, an example of the adjustment value setting process according to the embodiment of the present disclosure will be described. In Step S200, when it is not determined that it is possible to take the logical product based on the adjustment information corresponding to the target application, the communication device 100 resets the target application (S202).

Herein, the method of resetting the target application in Step S202 may be, for example, a method of estimating usable applications to set the estimated applications to the target application. More specifically, for example, the communication device 100 acquires position information representing a current position of the communication device 100 and/or time information representing a current time. The communication device 100 estimates the applications corresponding to enjoyable services as the usable applications at the current opposition of the communication device 100 represented by the acquired position information and/or at the current time represented by the time information.

By resetting the target applications on the basis of the current position of the communication device 100 represented by the acquired position information and/or the current time represented by the time information, the communication device 100 can reset the applications corresponding to services which is not used at the current position and/or at the current time, as the target applications. Accordingly, when the communication device 100 performs the process of Step S200 again, it is possible to further raise possibility of taking the logical product. The applications excluded from the target applications by the process described above are the applications corresponding to the services which is not used, and thus there is no particular problem even when it is difficult to normally perform the communication relating to the services.

The communication device 100 acquires the position information using, for example, a GPS (Global Positioning System) provided in the communication device 100, but the method of acquiring the position information in the communication device 100 according to the embodiment of the present disclosure is not limited thereto. For example, when the communication device 100 has a function of performing communication with the external device through a base station, it is possible to acquire information representing the base station from a server (example of external device), as the position information. Even in the case described above, since it is possible to specify substantially the current position of the communication device 100, the communication device 100 can estimate the applications corresponding to the enjoyable services at the current position of the communication device 100 represented by the acquired position information, as the usable applications.

The communication device 100 acquires the time information using, for example, a clock provided in the communication device 100, but the method of acquiring the time information in the communication device 100 according to the embodiment of the present disclosure is not limited thereto. For example, when the communication device 100 has a function of performing the communication with the external device such as the server, it is possible to acquire the time information from the external device.

The communication device 100 resets the target applications on the basis of the current position of the communication device 100 represented by the acquired position information and/or the current time represented by the time information.

The method of resetting the target applications in Step S202 is not limited thereto. For example, the communication device 100 excludes one or more applications with low priority from the process target to reset the target applications on the basis of the priority set in the target applications in the process of Step S5200.

Herein, for example, the priority of the application is set on the basis of an operation signal corresponding to a user operation transmitted from an operation unit (to be described later), or an external operation signal corresponding to a user operation transmitted from an external operation device such as a remote controller. The method of setting the priority of the application according to the embodiment of the present disclosure is not limited thereto. For example, the communication device 100 may set the priority corresponding to frequency in use on the basis of history information representing a use history of the application.

More specifically, for example, the communication device 100 sets the priority such that the priority of the application with a larger number of performance times becomes higher on the basis of the number of performance times of the application recorded in the history information and the range of the number of times previously regulated for each priority.

When the position history information representing the position where the application is used and the time history information representing the time when the application is used are included in the history information, the communication device 100 may set the priority on the basis of the position information and the position history information and/or the time information and the time history information. In the case described above, the communication device 100 sets the priority using the history information corresponding to the current position and/or the current time in the history information. In addition to the frequency in use, by setting the priority on the basis of the current position and/or the current time, the communication device 100 may set the priority such that the priority of the application corresponding to the enjoyable service becomes higher.

For example, the communication device 100 resets the target applications in Step S202 as described above. The process of Step S202 according to the embodiment of the present disclosure is not limited thereto. For example, the communication device 100 may reset the target applications, by setting the applications selected by the user to the target applications or by excluding the applications selected by the user from the target applications. More specifically, when it is not determined that it is possible to take the logical product based on the adjustment information corresponding to the target applications in Step S200, for example, the communication device 100 displays a selection screen on which the target applications are allowed to be selected by the user, on a display screen. The communication device 100 resets the target applications on the basis of the user operation on the selection screen. Herein, for example, the communication device 100 displays the selection screen on the display screen of a display unit (to be described later) provided in the communication device 100, but the process in the communication device 100 is not limited thereto. For example, the communication device 100 may display the selection screen on a display screen on an external display device, not depending on whether or not the display unit (to be described later) is provided.

When the target applications are reset in Step S202, the communication device 100 performs the process of Step S200 again. As described above, the number of target applications becomes small by the process of Step S202. Accordingly, by performing the process of Step S202, it is possible to raise the possibility of taking the logical product in the process of Step S200 performed again. As described above, for example, the communication device 100 sets the number of target applications on the basis of the current position of the communication device 100 and/or the current time or the priority, and thus the possibility of causing a problem caused by decreasing the number of target applications is reduced even when the number of target applications is set.

When it is determined that it is possible to take the logical product based on the adjustment information corresponding to the target applications in Step S200, the communication device 100 sets the adjustment value on the basis of the result of the logical product (S204).

Herein, for example, the communication device 100 sets the adjustment values with a larger number of adjustable communication characteristics as the adjustment values used in the adjustment of the communication characteristics of the communication unit 102. For example, when the result of the logical product is the result shown in FIG. 9, the communication device 100 sets the third adjustment value shown in FIG. 9 as the adjustment value used in the adjustment of the communication characteristics of the communication unit 102. When there are a plurality of adjustment values with the maximum number of adjustable communication characteristics, for example, the communication unit 100 sets the adjustment value with a smaller number as the adjustment value used in the adjustment of the communication characteristics of the communication unit 102, but the method of setting the adjustment value in the case described above is not limited thereto. For example, the communication device 100 may set a randomly selected adjustment value of the adjustment values with the maximum number of adjustable communication characteristics as the adjustment value used in the adjustment of the communication characteristics of the communication unit 102.

The method of setting the adjustment value according to the embodiment of the present disclosure is not limited thereto. For example, the communication device 100 may set an adjustment value different for each communication characteristic (for each adjustment item), such as "1 is set as the adjustment value of the resonance frequency, and 5 is set as the adjustment value of the Q value".

For example, by performing the process shown in FIG. 8, the communication device 100 may the adjustment value as the adjustment value used in the adjustment of the communication characteristics of the communication unit 102. The process of setting the adjustment value according to the embodiment of the present disclosure is not limited to the process shown in FIG. 8. For example, the communication device 100 may combine the method of resetting the target applications based on the estimation result of the usable services and the method of resetting the target applications based on the priority to set the adjustment values used in the adjustment of the communication characteristics of the communication unit 102.

(ii) Second Example

Figure 10:
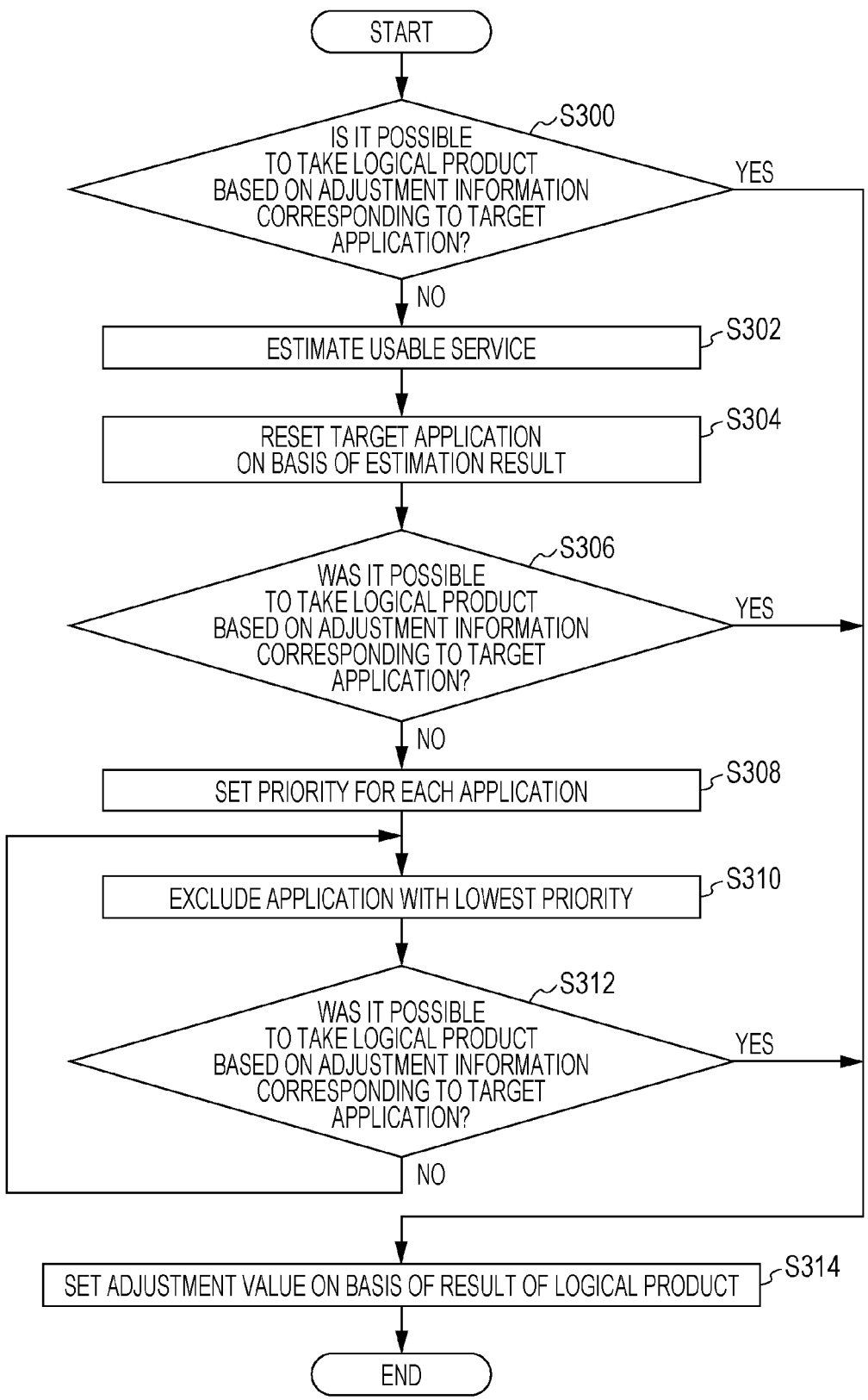
FIG. 10 is a flowchart illustrating another example of the adjustment value setting process according to the embodiment of the present disclosure.

FIG. 10 is a flowchart illustrating another example of the adjustment value setting process according to the embodiment of the present disclosure. Herein, FIG. 10 shows an example of a process in which the communication device 100 combines the method of resetting the target applications based on the estimation result of the usable services and the method of resetting the target applications based on the priority to set the adjustment values.

The communication device 100 determines whether or not it is possible to take the logical product based on the adjustment information corresponding to the target applications in the same manner as Step S200 shown in FIG. 8 (S300). In Step S300, when it is determined that it is possible to take the logical product based on the adjustment information corresponding to the target applications, the communication device 100 sets the adjustment values on the basis of the result of the logical product in the same manner as Step S204 shown in FIG. 8 (S314).

In Step S300, when it is not determined that it is possible to take the logical product based on the adjustment information corresponding to the target applications, the communication device 100 estimates the usable services (S302). The communication device 100 resets the target applications on the basis of the estimation result (S304). Herein, for example, as described above, the communication device 100 resets the target applications on the basis of the current position of the communication device 100 represented by the acquired position information and/or the current time represented by the time information.

When the target applications are reset in Step S304, the communication device 100 determines whether or not it is possible to take the logical product based on the adjustment information corresponding to the target applications in the same manner as Step S200 shown in FIG. 8 (S306). In Step S306, when it is determined that it is possible to take the logical product based on the adjustment information corresponding to the target applications, the communication device 100 sets the adjustment value based on the result of the logical product in the same manner as Step S204 shown in FIG. 8 (S314).

In Step S306, when it is not determined that it is possible to take the logical product based on the adjustment information corresponding to the target applications, the communication device 100 sets the priority for each application (S308). Herein, for example, as described above, the communication device 100 sets the priority on the basis of the history information. When the priority is set in advance for each application, for example, the communication device 100 may not perform the process of Step S308.

When the process of Step S308 is performed, the communication device 100 excludes the application with the lowest priority from the target applications (S310). In the same manner as Step S200 shown in FIG. 8, the communication device 100 determines whether or not it is possible to take the logical product based on the adjustment information corresponding to the target applications (S312).

In Step S312, when it is not determined that it is possible to take the logical product based on the adjustment information corresponding to the target applications, the communication device 100 repeats the processes from Step S310. In Step S312, when it is determined that it is possible to take the logical product based on the operation information corresponding to the target applications, the communication device 100 sets the adjustment values on the basis of the result of the logical product in the same manner as Step S204 shown in FIG. 8 (S314).

The communication device 100 can set the adjustment values used in the adjustment of the communication characteristics of the communication unit 102, for example, by performing the process shown in FIG. 10. The process of setting the adjustment values according to the embodiment of the present disclosure is not limited to the process shown in FIG. 10. For example, in FIG. 10, the resetting of the target applications based on the estimation result of the usable services is performed, and then the resetting of the target applications based on the priority is repeatedly performed, but the communication device 100 may repeatedly perform the resetting method in arbitrary order.

(iii) First Exceptional Process

As shown in FIG. 8 and FIG. 10, the communication device 100 sets the adjustment values by taking the logical product of the adjustment information corresponding to the target applications. The applications installed in the communication device 100 may be installed by the user as described above. For this reason, the parameters of the communication characteristics in the adjustment information corresponding to the installed applications may not be included in the adjustment range of the communication characteristics which can be adjusted by the communication unit 102 of the communication device 100.

As a first exceptional process in the adjustment value setting process according to the embodiment of the present disclosure, an example of the process in the communication device 100 in the case described above will be described by way of example of the resonance frequency (example of communication characteristics).

When the range of the adjustable resonance frequency in the communication device 100 is represented by, for example, the five stages as shown in FIG. 6 and the adjustment value 1 is selected, the adjustable lowest resonance frequency is set in the communication device 100, and the resonance frequency gets higher as the number of the adjustment value gets larger. In the communication device 100, when the adjustment value 5 is selected, the adjustable highest resonance frequency is set.

In the case described above, when the resonance frequency (example of parameters of communication characteristics) usable in the additionally installed applications is as follows, it is assumed that it is difficult to obtain communication performance satisfying desired requirement for the applications even when the communication device 100 uses any adjustment value.

A case where the resonance frequency usable in the applications is equal to or lower than the resonance frequency obtainable by the adjustment value 1

A case where the resonance frequency usable in the applications is equal to or higher than the resonance frequency obtainable by the adjustment value 5

A case where the resonance frequency usable in the applications is a resonance frequency obtainable only between the numbers of the adjustment values (for example, it can be used as only the resonance frequency obtainable between the adjustment value 1 and the adjustment value 2)

In the case described above, for example, the communication device 100 adjusts the parameters of the communication characteristics in the adjustment information corresponding to the applications, and sets the adjustment values used in the adjustment of the communication characteristics of the communication unit 102 on the basis of the adjustment information for each selectively adjusted application. More specifically, in the case described above, for example, the communication unit 100 sets the resonance frequency closest to the resonance frequency usable in the applications in the adjustment range of the communication characteristics adjustable by the communication device 100, to the parameters of the communication characteristics corresponding to the applications. Herein, for example, by increasing the combination part between the communication characteristics of "usable" and the value of the communication characteristics in the adjustment information, the communication device 100 adjusts the parameters of the communication characteristics, but the method of adjusting the parameters of the communication characteristics is not limited thereto.

For example, by adjusting the parameters of the communication characteristics in the adjustment information as described above, the possibility of obtaining the lowest communication performance in which communication can be normally performed even when it is difficult to obtain the highest communication performance satisfying the desired requirement in the applications. Accordingly, by performing the first exceptional process, the communication device 100 can further raise the possibility of performing the communication by infrastructure devices with different communication characteristics even when the parameters of the communication characteristics in the adjustment information corresponding to the installed applications are not included in the adjustment range of the communication characteristics adjustable by the communication unit 102 of the communication device 100.

(iv) Second Exceptional Process

For example, in FIG. 8 and FIG. 10, it is assumed that there is the adjustment information corresponding to the target applications, but, for example, it may be assumed that there is no adjustment information corresponding to the unexpected additionally installed applications. Next, as the second exceptional process in the adjustment value setting process according to the embodiment of the present disclosure, an example of a process when there is no adjustment information corresponding to the target applications will be described.

When there is no adjustment information corresponding to the target applications as described above, for example, the communication device 100 performs communication with the external device such as the server transmitting the applications with no adjustment information to acquire the adjustment information from the external device. Even when there is the adjustment information corresponding to the target applications, it is obvious that the communication device 100 can acquire the latest adjustment information from the external device such as the server as described above.

When it is difficult to acquire the adjustment information from the external device such as the server, the communication device 100 excludes the applications with no adjustment information from the target applications.

For example, by performing the second exceptional process described above, it is possible to avoid that there is no adjustment information corresponding to the target applications.

The communication device 100 performs, for example, the process (i) to the process (iv) described above as the adjustment value setting process. It is obvious that the adjustment value setting process according to the embodiment of the present disclosure is not limited to the process (i) to the process (iv) described above.

Referring to FIG. 5 again, an example of the process relating to the communication control method according to the embodiment of the present disclosure will be described. When the adjustment values used in the adjustment of the communication characteristics of the communication unit 102 are set in Step S102, the communication device 100 adjusts the communication characteristics by transmitting the adjustment signals based on the set adjustment values to the communication unit 102 (S104). More specifically, the communication device 100 (more precisely, for example, the adjustment control unit to be described later) reads the adjustment values (example of set adjustment values) recorded on a recording medium such as RAM from the recording medium, and transmits an adjustment command based on the read adjustment values to the MPU 118 (processing unit). For example, the MPU 118 transmits the adjustment signal corresponding to the adjustment command to the adjustment unit 114 through the buffer 126, and thus the communication device 100 adjusts the communication characteristics of the communication unit 102.

For example, by performing the process shown in FIG. 5, the communication device 100 sets the adjustment values by which all the applications can perform communication, and thus it is possible to perform the communication by adjusting the communication characteristics using the set adjustment values. Accordingly, the communication device 100 can perform communication with the infrastructure devices even when there is difference in communication characteristics of one or more infrastructure devices providing the services corresponding to the target applications. The user of the communication device 100 can enjoy various services provided by the infrastructure devices with different communication characteristics using the communication device 100.

The process relating to the communication control method according to the embodiment of the present disclosure is not limited to the process shown in FIG. 5. For example, even when the communication characteristics are adjusted once, the possibility that it is difficult to obtain the desired communication performance is not zero as a result of performing the communication using the adjusted communication characteristics. As another example of the process relating to the communication control method according to the embodiment of the present disclosure, an example of a process in which the communication characteristics can be adjusted again when the communication unit 102 receives the carrier wave transmitted from the external device of the communication target and it is difficult to perform the communication for a predetermined time will be described.

Figure 11:
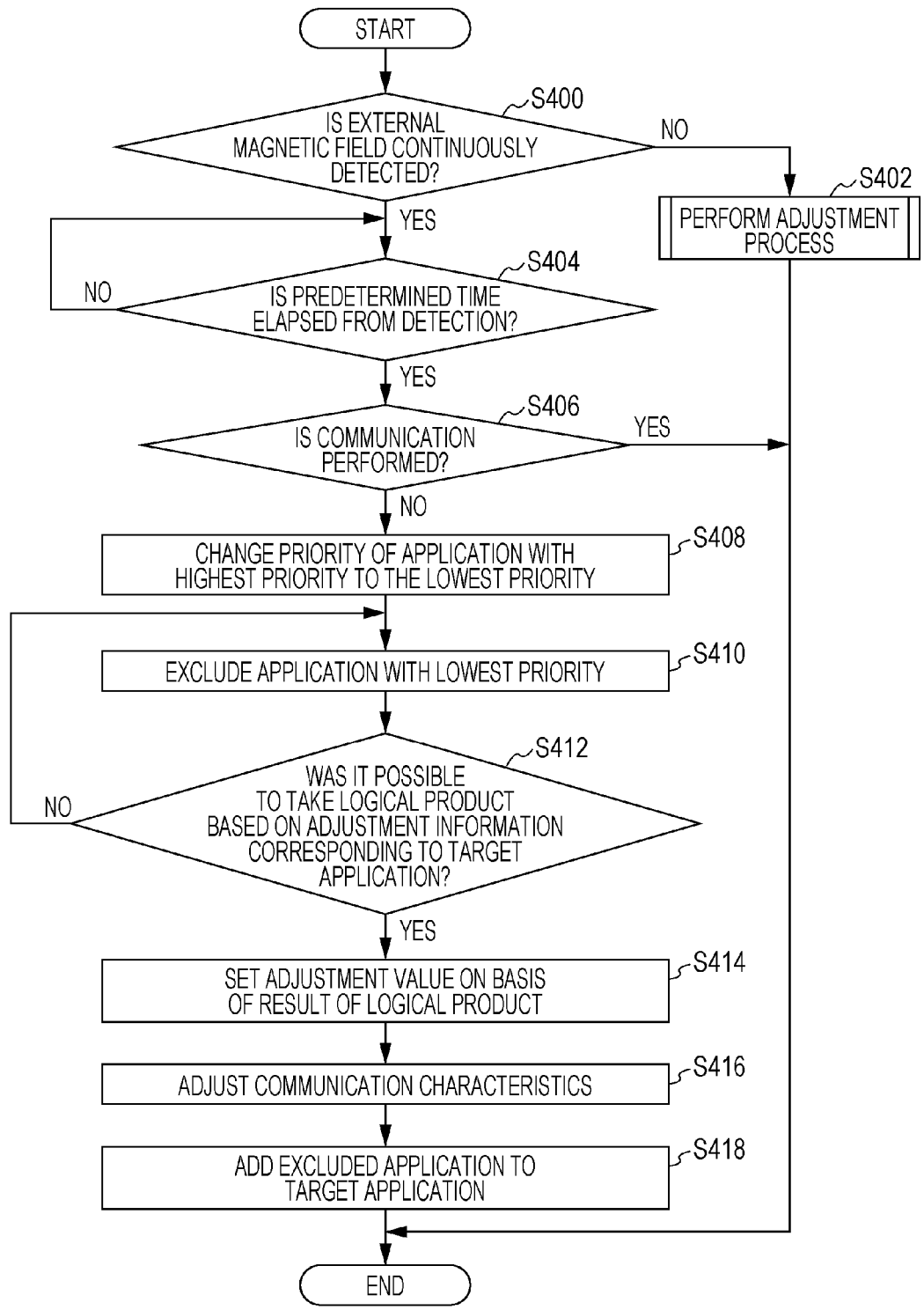
FIG. 11 is a flowchart illustrating another example of a process according to a communication control method according to the embodiment of the present disclosure.

FIG. 11 is a flowchart illustrating another example of the process relating to the communication control method according to the embodiment of the present disclosure.

The communication device 100 determines whether or not external magnetic field (example of carrier wave) is continuously detected (S400). The determination of Step S400 is performed, for example, by the MPU 118 of the IC chip 112 constituting the communication unit 102, but may be performed by the control unit 106.

When it is not determined that the external magnetic field is not continuously detected in Step S400, the communication device 100 performs the adjustment process (S402). Herein, for example, the adjustment process in Step S402 may be the process shown in FIG. 5. The communication device 100 ends the process shown in FIG. 11. The process shown in FIG. 11 is not a type of process which is not performed again when it is ended once, but rather is performed periodically or non-periodically.

When it is determined that the external magnetic field is continuously detected in Step S400, the communication device 100 determines a predetermined time is elapsed after the detection (S404). The determination of Step S404 is performed, for example, by the MPU 118 of the IC chip 112 constituting the communication unit 102, but may be performed by the control unit 106. The predetermined time relating to Step S404 may be, for example, a previously regulated fixed time and a time which can be appropriately adjusted by the user.

When it is not determined that the predetermined time is elapsed after the detection in Step S404, the communication device 100 does not proceeds the process until it is determined that the predetermined time is elapsed.

When it is determined that the predetermined time is elapsed after the detection in Step S404, the communication device 100 determines whether or not the communication is performed (S406). The determination of Step S406 is performed, for example, by the control unit 106 on the basis of the report of performing the communication transmitted from the IC chip 112 constituting the communication unit 102, but the process in the communication device 100 is not limited thereto.

When it is determined that the communication is performed in Step S406, the communication device 100 does not adjust the communication characteristics and ends the process shown in FIG. 11.

When it is not determined that the communication is performed in Step S406, the communication device 100 change the priority of the application with the highest priority among the target applications, to the lowest priority (S408). For example, as described above, by lowering the priority of one or more applications with the high priority among priorities set for the applications that are the process target, in the communication device 100, the possibility of excluding one or more applications with the high priority before the change becomes high in the processes of Steps S410 and S412 to be described later. Accordingly, the communication device 100 can further raise the possibility of performing the communication after re-adjustment of the communication characteristics. It is obvious that the process when it is not determined the communication is performed in Step S406 is not limited to the changing the priority of the application with the highest priority to the lowest priority.

When the process of Step S408 is performed, the communication device 100 excludes the application with the lowest priority from the target applications in the same manner as Step S310 shown in FIG. 10 (S410). The communication device 100 determines whether or not it is possible to take the logical product based on the adjustment information corresponding to the target applications in the same manner as Step S200 shown in FIG. 8 (S412).

In Step S410, when it is not determined that it is possible to take the logical product based on the adjustment information corresponding to the target applications, the communication device 100 repeats the processes from Step S410.

In Step S412, when it is determined that it is possible to take the logical product based on the adjustment information corresponding to the target applications, the communication device 100 sets the adjustment values on the basis of the result of the logical product in the same manner as Step S204 shown in FIG. 8 (S414). In the same manner as Step S104 shown in FIG. 5, the communication device 100 adjusts the communication characteristics by transmitting the adjustment signals based on the set adjustment values to the communication unit 102 (S416).

The communication device 100 adds the applications excluded in the process of Step S412 to the target applications again (S418), and ends the process shown in FIG. 11.

When the communication unit 102 receives the carrier wave transmitted from the external device of the communication target and it is difficult to perform the communication for a predetermined time, for example, the communication device 100 performs the process shown in FIG. 11 to perform the adjustment of the communication characteristics again. Accordingly, the communication device 100 can raise the possibility of performing the communication with the external device transmitting the received carrier wave, by the process shown in FIG. 11.

The process when the communication unit 102 receives the carrier wave transmitted from the external device of the communication target and it is difficult to perform the communication for a predetermined time is not limited to the process shown in FIG. 11. For example, possibility that the user of the communication device 100 recognizes the service which the user wants to use is high. Accordingly, when the user is allowed to select the service which the user wants to use and the communication characteristics are adjusted on the basis of the adjustment information of the application corresponding to the selected service, it is possible to further raise the possibility of performing the communication with the external device transmitting the received carrier wave.

Figure 12:
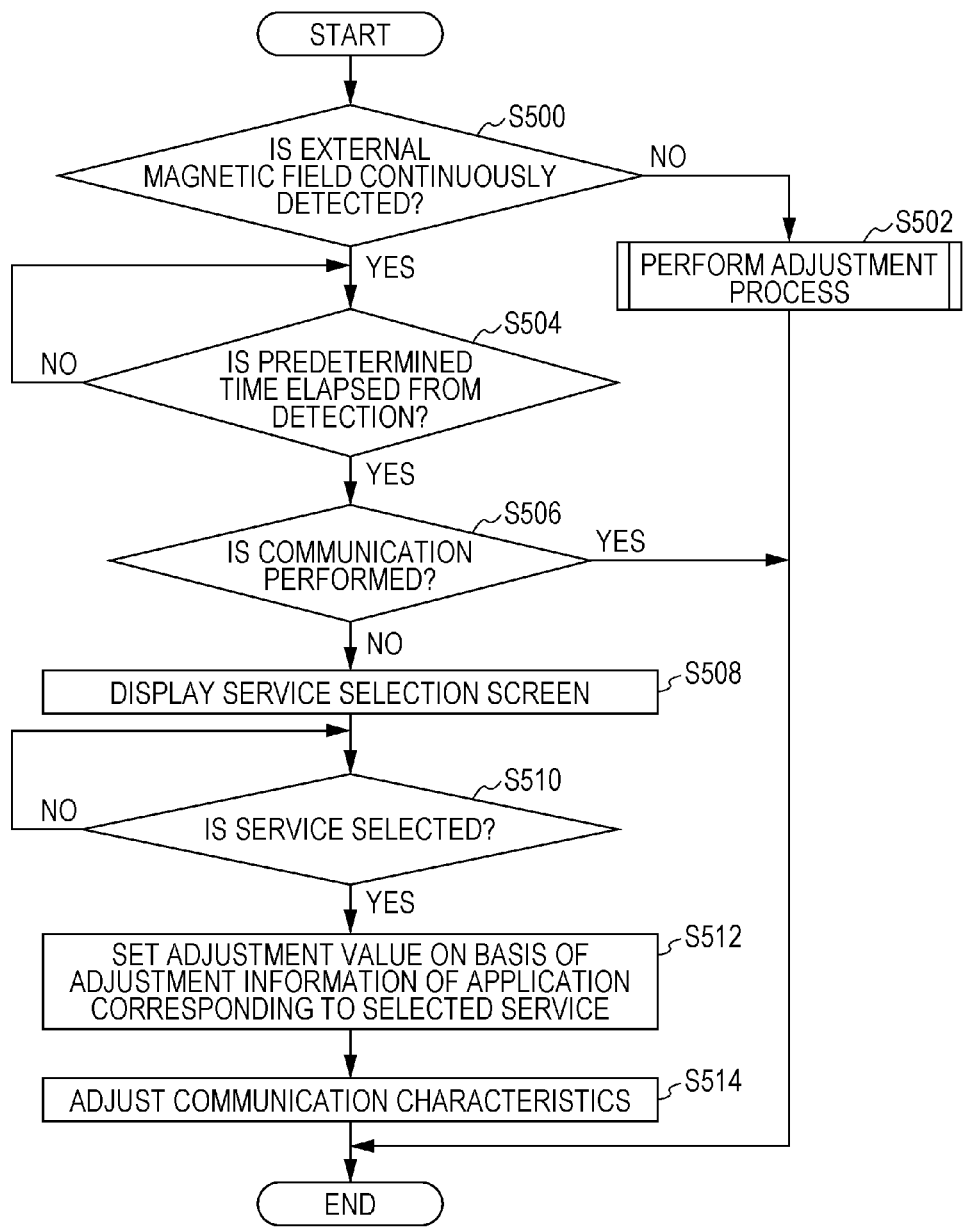
FIG. 12 is a flowchart illustrating another example of a process according to the communication control method according to the embodiment of the present disclosure.

FIG. 12 is a flowchart illustrating another example of the process relating to the communication control method according to the embodiment of the present disclosure. Herein, FIG. 12 shows an example of the process when the communication device 100 re-adjusts the communication characteristics on the basis of the adjustment information of the application corresponding to the service selected by the user, when the communication unit 102 receives the carrier wave transmitted from the external device of the communication target and it is difficult to perform the communication for a predetermined time.

The communication device 100 determines whether or not an external magnetic field (example of carrier wave) is continuously detected in the same manner as Step S400 shown in FIG. 11 (S500). When it is not determined that the external magnetic field is not continuously detected in Step S500, the communication device 100 performs the adjustment process in the same manner as Step S402 shown in FIG. 11 (S502). The communication device 100 ends the process shown in FIG. 12. The process shown in FIG. 12 is not a process which is not performed again when it is ended once, and is performed periodically or non-periodically.

When it is determined that the external magnetic field is continuously detected in Step S500, the communication device 100 determines a predetermined time is elapsed after the detection in the same manner as Step S404 shown in FIG. 11 (S504). When it is not determined that the predetermined time is elapsed after the detection in Step S504, the communication device 100 does not proceed with the process until it is determined that the predetermined time is elapsed.

When it is determined that the predetermined time is elapsed after the detection in Step S504, the communication device 100 determines whether or not the communication is performed in the same manner as Step S406 shown in FIG. 11 (S506). When it is determined that the communication is performed in Step S506, the communication device 100 does not adjust the communication characteristics and ends the process shown in FIG. 12.

When it is not determined that the communication is performed in Step S506, the communication device 100 displays the service selection screen for allowing the user to select the service on the display screen (S508).

Herein, when the priority is set for the applications, the communication device 100 may display the service selection screen on the basis of the priority. The service selection screen based on the priority may be, for example, a service selection screen on which selection items of services are arranged in order of high priority of the corresponding application, and a service selection screen on which a selection icon of a service corresponding to the application with high priority is largely displayed. For example, the communication device 100 displays the service selection screen on the display screen of a display unit (to be described later) provided in the communication device 100, but the process in the communication device 100 is not limited thereto. For example, the communication device 100 may displays the service selection screen on a display screen of an external display device, not depending on whether or not the display unit (to be described later) is provided. FIG. 12 shows the example in which the communication 100 displays the service selection screen on the display screen, but the screen displayed in Step S508 by the communication device 100 is not limited to the service selection screen described above. For example, the communication device 100 may display a selection screen for selecting applications in Step S508.

When the service selection screen is display on the display screen in Step S508, the communication device 100 determines whether or not the service is selected (S510). In step S510, when it is not determined that the service is selected, the communication device 100 does not proceed the process until it is determined that the service is selected. Although not shown in FIG. 12, for example, when it is not determined that the service is selected even when a previously regulated predetermined time is elapsed, an error screen may be displayed and the process shown in FIG. 12 may be ended (so-called time-out).

In Step S510, when it is determined that the service is selected, the communication device 100 sets the adjustment value on the basis of the adjustment information of the application corresponding to the selected service (S512). In the same manner as Step S104 shown in FIG. 5, the communication device 100 adjusts the communication characteristics by transmitting the adjustment signals based on the set adjustment values to the communication unit 102 (S514).

When the communication unit 102 receives the carrier wave transmitted from the external device of the communication target and it is difficult to perform the communication for a predetermined time, for example, the communication device 100 performs the process shown in FIG. 12 to perform the adjustment of the communication characteristics again. Accordingly, the communication device 100 can adjust the communication characteristics to correspond to the service selected by the user, by the process shown in FIG. 12, and thus it is possible to further raise the possibility of performing the communication with the external devices transmitting the received carrier wave.

For example, the communication device 100 performs the processes shown in FIG. 5, FIG. 11, and FIG. 12, as the process relating to the communication control method according to the embodiment of the present disclosure. It is obvious that the process relating to the communication control method according to the embodiment of the present disclosure is not limited to the processes shown in FIG. 5, FIG. 11, and FIG. 12.

(Communication Device according to Embodiment of Present Disclosure)

Next, a configuration of the communication device 100 according to the embodiment of the present disclosure, capable of performing the process relating to the communication control method according to the embodiment of the present disclosure will be described.

Figure 13:
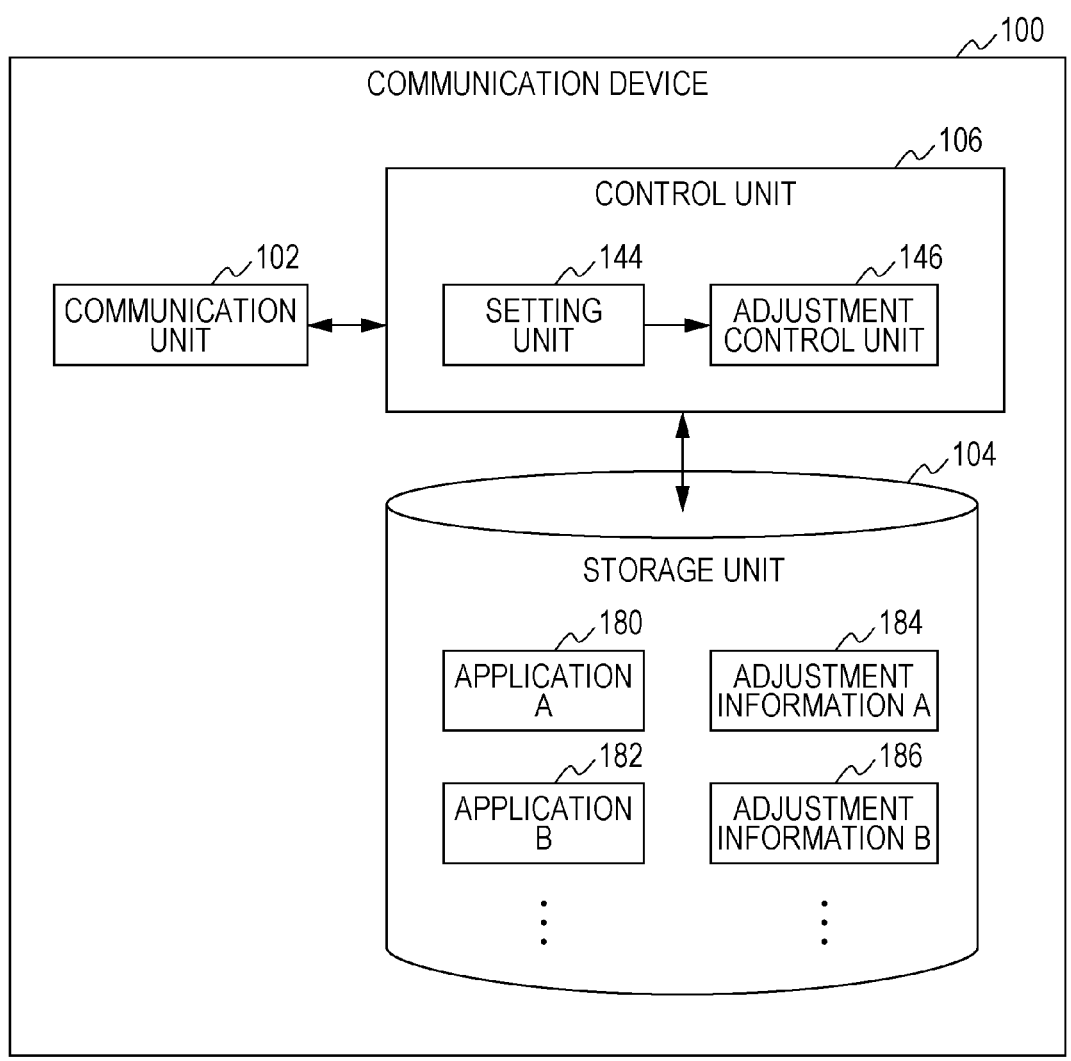
FIG. 13 is a block diagram illustrating an example of a configuration of a communication device according to the embodiment of the present disclosure.

FIG. 13 is a block diagram illustrating an example of a configuration of the communication device 100 according to the embodiment of the present disclosure. The communication device 100 includes, for example, a communication unit 102, a storage unit 104, and a control unit 106.

The communication device 100 may include, for example, a ROM (Read Only Memory, not shown), a RAM (not shown), an operation unit (not shown) which can be operated by the user, and a display unit (not shown) that displays various screens on a display screen. For example, the communication device 100 connects the constituent elements by a bus as a transmission path of data.

The ROM (not shown) stores programs used by the control unit 106, or control data such as operation parameters. The RAM (not shown) temporarily stores the programs executed by the control unit 106.

The operation unit (not shown) may be, for example, a button, a directional key, a rotation type selecting device such as a jog dial, or combination thereof. The display unit (not shown) may be, for example, a liquid crystal display (LCD), and an organic EL display (organic ElectroLuminescence display or OLED display (Organic Light Emitting Diode display). The display unit (not shown) may be a device which can perform displaying and user operation, such as a touch screen. The communication device 100 may be connected to an operation input device (for example, keyboard and mouse) as the external device of the communication device 100, and the external display device.

[Example of Hardware Configuration of Communication Device 100]

Figure 14:
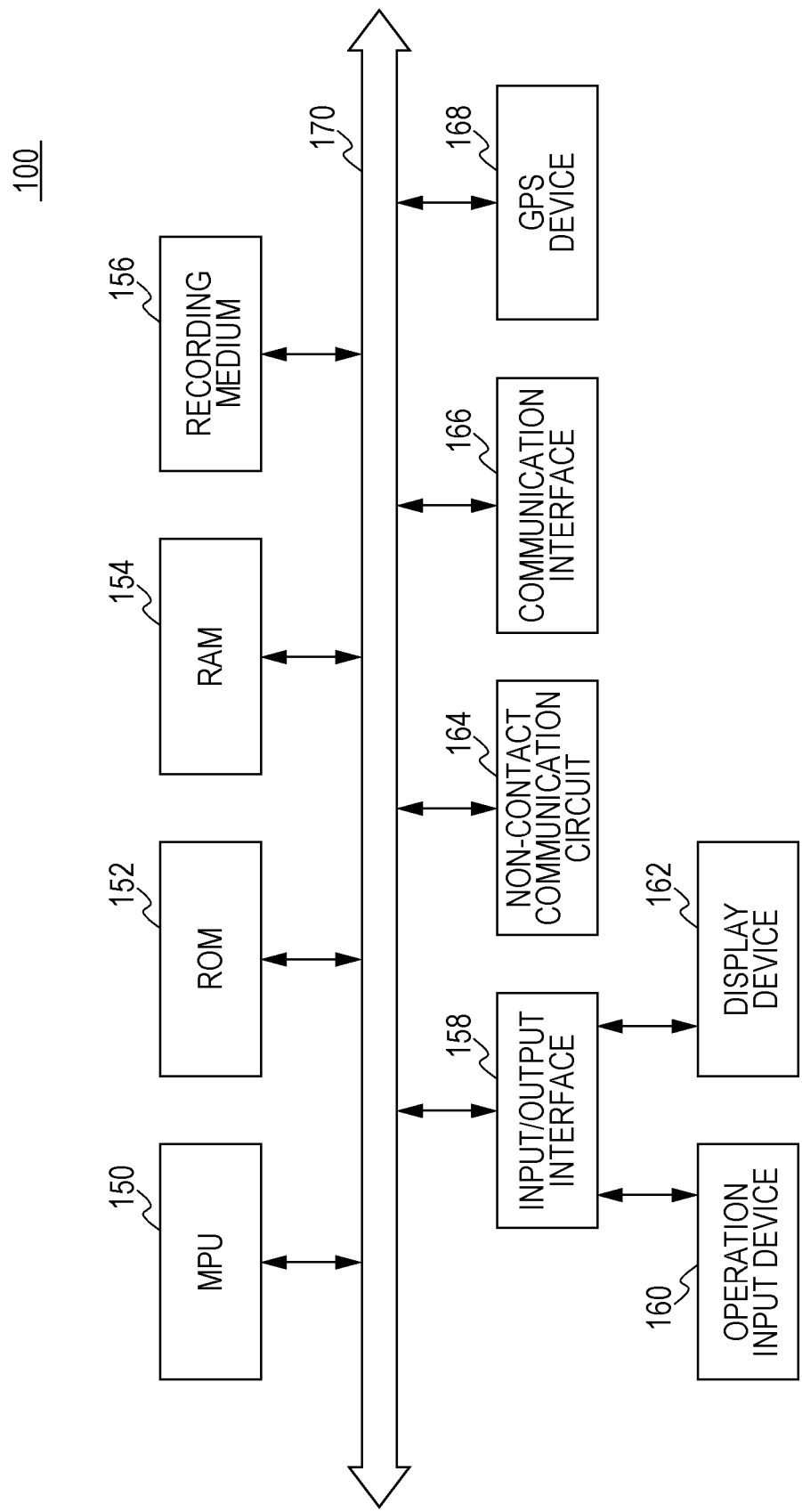
FIG. 14 is a diagram illustrating an example of a hardware configuration of the communication device according to the embodiment of the present disclosure.

FIG. 14 is a diagram illustrating an example of a hardware configuration of the communication device 100 according to the embodiment of the present disclosure. Referring to FIG. 14, the communication device 100 includes, for example, an MPU 150, a ROM 152, a RAM 154, a recording medium 156, an input/output interface 158, an operation input device 160, a display device 162, a non-contact communication circuit 164, a communication interface 166, and a GPS device 168. For example, the communication device 100 connects the constituent elements by a bus 170 as a transmission path of data.

The MPU 150 is formed of an integrated circuit in which an MPU and various circuits for realizing a control function are integrated, and serves as the control unit 106 that controls the whole of the communication device 100. The MPU 150 may serve as a setting unit 144 to be described later and an adjustment control unit 146 in the communication device 100.

The ROM 152 stores, for example, programs used by the MPU 150 and control data such as operation parameters, and the RAM 154 primarily stores, for example, the programs executed by the MPU 150.

The recording medium 156 is a storage unit in the communication device 100, and serves as the storage unit 104. For example, the applications and the adjustment information are stored in the recording medium 156. Herein, the recording medium 156 may be, for example, a magnetic recording medium such as a hard disk, a nonvolatile memory such as a flash memory, an MRAM (magnetoresistive Random Access Memory), and an FeRAM (Ferroelectric Random Access Memory). The recording medium 156 may be detachable from the communication device 100.

The input/output interface 158 connects, for example, the operation input device 160 and the display device 162. The operation input device 160 serves as the operation unit (not shown), and the display device 162 serves as the display unit (not shown). The input/output interface 160 may be, for example, a USB (Universal Serial Bus) terminal, a DVI (Digital Visual Interface) terminal, an HDMI (High-Definition Multimedia Interface) terminal, and various processing circuits. For example, the operation input device 160 may be provided on the communication device 100, and is connected to the input/output interface 158 in the communication device 100. The operation input device 160 may be, for example, a button, a directional key, a rotation type selecting device such as a jog dial, or combination thereof. For example, the display device 162 may be provided on the communication device 100, and is connected to the input/output interface 158 in the communication device 100. The display device 162 may be, for example, a liquid crystal display and an organic EL display. It is obvious that the input/output interface 158 may be connected to the operation input device (for example, keyboard and mouse) as the external device of the communication device 100 and the display device (for example, external display). The display device 162 may be a device which can perform displaying and user operation, such as a touch screen.

The non-contact communication circuit 164 is a communication unit provided in the communication device 100, and takes a role of performing non-contact communication relating to NFC with the external device. The non-contact communication circuit 164 has, for example, the configuration shown in FIG. 1, but the configuration of the non-contact communication circuit 164 is not limited to the configuration shown in FIG. 1.

The communication interface 166 is another communication unit provided in the communication device 100, and takes a role of performing wireless/wire communication with the external device through a network (or directly). The communication interface 166 may be, for example, a communication antenna, an RF (Radio Frequency) circuit (wireless communication), an IEEE 802.15.1 port and transceiver circuit (wireless communication), an IEEE 802.11b port and transceiver circuit (wireless communication), a LAN (Local Area Network) terminal and transceiver circuit (wire communication). The network according to the embodiment of the present disclosure may be, for example, a wire network such as a LAN and WAN (Wide Area Network), a wireless network via a base station such as wireless WAN (WWAN: Wireless Wide Area Network), or the Internet using communication protocol such as TCP/IP (Transmission Control Protocol/Internet Protocol).

The GPS device 168 is a position information acquiring unit provided in the communication device 100.

For example, the communication device 100 performs the process relating to the communication control method described above by the configuration shown in FIG. 14. The hardware configuration of the communication device 100 according to the embodiment of the present disclosure is not limited to the configuration shown in FIG. 14. For example, the communication device 100 may not be provided with the operation device 160, the display device 162, and the GPS device 168 shown in FIG. 14. The communication device 100 may not be provided with at least one of the non-contact communication circuit 164 and the communication interface 166 shown in FIG. 14. The communication device 100 may be provided with a clock as the time information acquiring unit.

Referring to FIG. 13 again, an example of the configuration of the communication device 100 will be described. The communication unit 102 is a communication unit provided in the communication device 100, and takes a role of performing wireless/wire communication with, for example, the infrastructure device such as the reader/writer and the external device such as the server through the network (or directly). The communication unit 102 has a configuration capable of adjusting the communication characteristics.

The communication 102 may have, for example, the configuration (configuration for performing the non-contact communication relating to NFC) shown in FIG. 1, but the configuration of the communication unit 102 according to the embodiment of the present disclosure is not limited to the configuration shown in FIG. 1. For example, the communication unit 102 may have a configuration coping with various communication methods capable of adjusting the communication characteristics, such as contact-type non-contact communication, proximity type non-contact communication, and distance type non-contact communication of a UHF band. In FIG. 13, the communication device 100 is provided with one communication unit, but the communication device 100 according to the embodiment of the present disclosure may be provided with, for example, a plurality of communication units.

The storage unit 104 is a storage unit provided in the communication device 100. Herein, the storage unit 104 may be, for example, a magnetic recording medium such as a hard disk, and a nonvolatile memory such as a flash memory.

For example, the storage unit 104 stores various applications such as applications relating to communication, and adjustment information. FIG. 13 shows an example in which the application A180, the application B182, . . . , the adjustment information A corresponding to the application A180, the adjustment information B corresponding to the application B182, . . . are stored in the storage unit 104.

The control unit 106 is formed of, for example, an MPU, and takes a role of controlling the whole of the communication device 100. The control unit 106 is provided with the setting unit 144 and the adjustment control unit 146, and takes a role of initiatively performing the process relating to the communication control method according to the embodiment of the present disclosure.

The setting unit 144 sets the adjustment values used in the adjustment of the communication characteristics of the communication unit 102 on the basis of the adjustment information corresponding to the target applications set as the process target. More specifically, for example, the setting unit 144 initiatively performs the process of Step S102 shown in FIG. 5.

The adjustment control unit 146 controls the communication unit 102 to adjust the communication characteristics on the basis of the adjustment values set in the setting unit 144. More specifically, the adjustment control unit 146 initiatively performs, for example, the process of Step S104 shown in FIG. 5.

The control unit 106 is provided with, for example, the setting unit 144 and the adjustment control unit 146, to initiatively perform the process relating to the communication control method according to the embodiment of the present disclosure, for example, shown in FIG. 5. The configuration of the control unit 106 according to the embodiment of the present disclosure is not limited to the configuration shown in FIG. 13. For example, the control unit 106 may be provided with a functional block that more minutely controls the process relating to the communication control method according to the embodiment of the present disclosure, such as the application setting unit that performs the process of Step S100 shown in FIG. 5 and the exceptional processing unit that performs the exceptional process described above.

The communication device 100 has, for example, the configuration shown in FIG. 13, and thus can realize the process relating to the communication control method according to the embodiment of the present disclosure described above. Accordingly, for example, by the configuration shown in FIG. 13, the communication device 100 can perform communication with each infrastructure device even when there is a difference in communication characteristics of one or more infrastructure devices providing a service corresponding to the target application.

The configuration of the communication device 100 according to the embodiment of the present disclosure is not limited to the configuration shown in FIG. 13. For example, the communication device 100 according to the embodiment of the present disclosure may be formed of the communication unit 102 shown in FIG. 1. In the case described above, for example, the MPU 118 (processing unit) of the IC chip shown in FIG. 1 serves as the control unit 106, and the internal memory 122 of the IC chip 112 serves as the storage unit 104. Even with the configuration described above, the communication device 100 can realize the process relating to the communication control method according to the embodiment of the present disclosure described above.

The communication device 100 according to the embodiment of the present disclosure may not be provided with, for example, the storage unit 104, and may appropriately acquire the applications and adjustment information relating to the communication, stored in the storage medium (external storage unit) provided in the external device connected in the wire/wireless manner, from the external device to process them. Even with the configuration described above, the communication device 100 can realize the process relating to the communication control method according to the embodiment of the present disclosure described above.

As described above, the communication device 100 according to the embodiment of the present disclosure sets the adjustment values used in the adjustment of the communication characteristics, in which all the target applications perform the communication, on the basis of the adjustment information for each application relating to the communication. The communication device 100 adjusts the communication characteristics using the set adjustment values. Accordingly, the communication device 100 can perform communication with each infrastructure device even when there is a difference in communication characteristics of one or more infrastructure devices providing a service corresponding to the target application. The user of the communication device 100 can enjoy various services provided by the infrastructure devices with different communication characteristics using the communication device 100.

Even after the communication characteristics are adjusted once, the communication device 100 can perform the adjustment of the communication characteristics again according to the service (or application) selected automatically or by the user. Even if it is difficult to normally perform the communication after adjusting the communication characteristics once, the communication device 100 performs the adjustment of the communication characteristics again to normally perform the communication. For example, even when a new service is provided after product shipment or after the communication device 100 is used by the user, the communication device 100 can perform ex-post coping with the service by using the application corresponding to the service and the adjustment information.

The communication device 100 has been described above as the embodiment of the present disclosure, but the embodiment of the present disclosure is not limited to the embodiment described above. The embodiment of the present disclosure may be applied to, for example, various apparatuses having a communication function, such as a mobile communication device such as a mobile phone, an IC card, an RFID tag, a computer such as a PC (Personal Computer), a video/music reproducing device (or video/music recording and reproducing device), and a mobile game device.

(Program according to Embodiment of Present Disclosure)

By a program (for example, program for realizing the process relating to the communication control method according to the embodiment of the present disclosure) for causing a computer to function as the communication device according to the embodiment of the present disclosure, it is possible to perform communication with infrastructure devices with different communication characteristics. By using the computer capable of executing the program described above, the user can enjoy various services provided by the infrastructure devices with different communication characteristics.

The preferred embodiment of the present disclosure has been described with reference to the accompanying drawings, but it is obvious that the present disclosure is not limited to the relating examples. It is clear that a person skilled in the art can represent various modified examples and amended examples within the scope described in Claims, and it is naturally understood that they are included in the technical scope of the present disclosure.

For example, in the above description, the program (computer program) for causing the computer to function as the communication device according to the embodiment of the present disclosure is provided, but the embodiment of the present disclosure may also provide a recording medium on which the program is stored.

The configuration described above represents an example of the embodiment of the present disclosure, and is naturally included in the technical scope of the present disclosure.

What is claimed is:

1. A communication device comprising:
   a communication unit that has adjustable communication characteristics, said communication unit having (i) a communication antenna for transmitting and receiving a carrier wave and (ii) an adjustment unit to adjust one or more of the adjustable communication characteristics;
   a setting unit that sets adjustment values used in adjustment of the communication characteristics of the communication unit on the basis of parameters corresponding to one or more target applications each of which is an application which is a process target among parameters of the adjustable communication characteristics set for applications relating to communication; and
   an adjustment control unit that controls the communication unit to adjust the communication characteristics on the basis of the adjustment values,
   in which one of the adjustable communication characteristics is a Q value of the communication antenna, and
   in which the adjustment unit includes a circuit to adjust the Q value of the communication antenna,
   in which when a plurality of target applications are present, the setting unit (i) determines parameters of adjustable communication characteristics including the Q value for all of the target applications which overlap each other and which enable communication to be performed for all of the target applications, and (ii) upon determining presence of overlapping parameters, sets adjustment values corresponding to the parameters of the overlapped communication characteristics including the Q value such that adjustment values corresponding to parameters of non-overlapping communication characteristics are not set and utilized.

2. The communication device according to claim 1, wherein when there is no parameter of the overlapped communication characteristics, the setting unit resets the target application, and sets the adjustment values on the basis of the parameters of each reset target application.

3. The communication device according to claim 2, wherein the setting unit estimates a usable application using position information representing a current position of the communication device and/or time information representing a current time to reset the estimated application as the target application.

4. The communication device according to claim 2, wherein the setting unit excludes one or more applications with low priority from the process target on the basis of priority set for each target application to reset the target application.

5. The communication device according to claim 4, wherein the setting unit sets the priority corresponding to frequency in use on the basis of history information representing use history of the application, for each application.

6. The communication device according to claim 5, wherein the history information includes position history information representing a position where the application is used, and/or time history information representing a time when the application is used, and
   wherein the setting unit sets the priority based on the history information corresponding to the current position of the communication device and/or the current time of the history information, on the basis of the position information representing the current position of the communication device and the position history information and/or the time information representing the current time, and the time history information.

7. The communication device according to claim 4, wherein when the communication unit receives the carrier wave transmitted from an external device of a communication target and does not perform communication for a predetermined time, the setting unit decreases the priority of one or more applications with high priority among the priority set for each target application to reset the adjustment value.

8. The communication device according to claim 1, wherein when the communication unit receives the carrier wave transmitted from an external device of a communication target and does not perform communication for a predetermined time, the setting unit resets the adjustment value on the basis of parameters corresponding to the application selected by user.

9. The communication device according to claim 1, wherein the adjustment unit adjusts the communication characteristics on the basis of a transmitted adjustment signal, and wherein the communication unit further includes a processing unit that transmits the adjustment signal to the adjustment unit on the basis of an adjustment command transmitted from the adjustment control unit.

10. The communication device according to claim 9, wherein the communication antenna includes a resonance circuit provided with a coil having a predetermined inductance and a capacitor having a predetermined capacitance, and
wherein the adjustment unit includes a circuit to adjust a resonance frequency of the communication antenna, as another one of the communication characteristics.

11. The communication device according to claim 9, wherein when the communication unit performs communication with an external device of the communication target by non-contact communication using a carrier wave of a predetermined frequency, the adjustment unit adjusts intensity of load modulation and/or an attenuation amount of a signal based on the transmission signal received by the communication antenna and transmitted from the external device, as the communication characteristics.

12. The communication device according to claim 9, wherein the communication unit includes a plurality of the communication antennas having a resonance circuit with a different resonance frequency provided with a coil having a predetermined inductance and a capacitor having a predetermined capacitance, and
wherein the adjustment unit selects one communication antenna among the plurality of communication antennas, and adjusts the resonance frequency of the communication antenna used in communication, as the communication characteristics.

13. The communication device according to claim 1, further comprising a storage unit that stores one or more applications and the parameters corresponding to the applications.

14. The communication device according to claim 1, wherein in addition to the Q value, the adjustable communication characteristics include a resonance frequency of the communication antenna, load modulation intensity, and an attenuation amount of a signal received by the communication antenna, and
wherein when the plurality of target applications are present, the setting unit (i) determines parameters of adjustable communication characteristics including the Q value, the resonance frequency, the load modulation intensity, and the attenuation amount for all of the target applications which overlap each other and which enable communication to be performed for all of the target applications, and (ii) upon determining presence of overlapping parameters, sets adjustment values corresponding to the parameters of the overlapped communication characteristics including the Q value, the resonance frequency, the load modulation intensity, and the attenuation amount such that adjustment values corresponding to parameters of non-overlapping communication characteristics are not set and utilized.

* * * * *